United States Patent [19]

Reichard, Jr. et al.

[11] Patent Number: 4,742,513
[45] Date of Patent: May 3, 1988

[54] ADAPTIVE WINDOW MULTIPLEXING TECHNIQUE

[75] Inventors: Gordon E. Reichard, Jr., Rolling Meadows; Semir Sirazi, Chicago, both of Ill.

[73] Assignee: Zenith Electronics Corporation, Glenview, Ill.

[21] Appl. No.: 760,217

[22] Filed: Jul. 29, 1985

[51] Int. Cl.⁴ .............................................. H04J 3/16
[52] U.S. Cl. ....................................... 370/96; 370/112
[58] Field of Search ................... 370/90, 96, 85, 83, 370/79, 61, 112; 340/825.06, 825.07, 825.08, 825.52

[56] References Cited

U.S. PATENT DOCUMENTS 3,826,872  7/1974  MacGregor ..................... 370/112
4,100,533  7/1978  Napolitano et al. ............... 370/96
4,227,178  10/1980  Gergaud et al. .................. 370/96

Primary Examiner—Douglas W. Olms
Assistant Examiner—Wellington Chin

[57] ABSTRACT

An adaptive window multiplexing technique. A multiplexer is coupled between a single destination and a plurality of data sources. The multiplexer includes control circuitry for sequentially addressing each of the data sources. When a data source has data available for transfer, the sequential addressing is interrupted and the addressed data source is allowed to transfer all of its data to the multiplexer. After data in one source is completely transferred, the next data source is addressed.

12 Claims, 12 Drawing Sheets

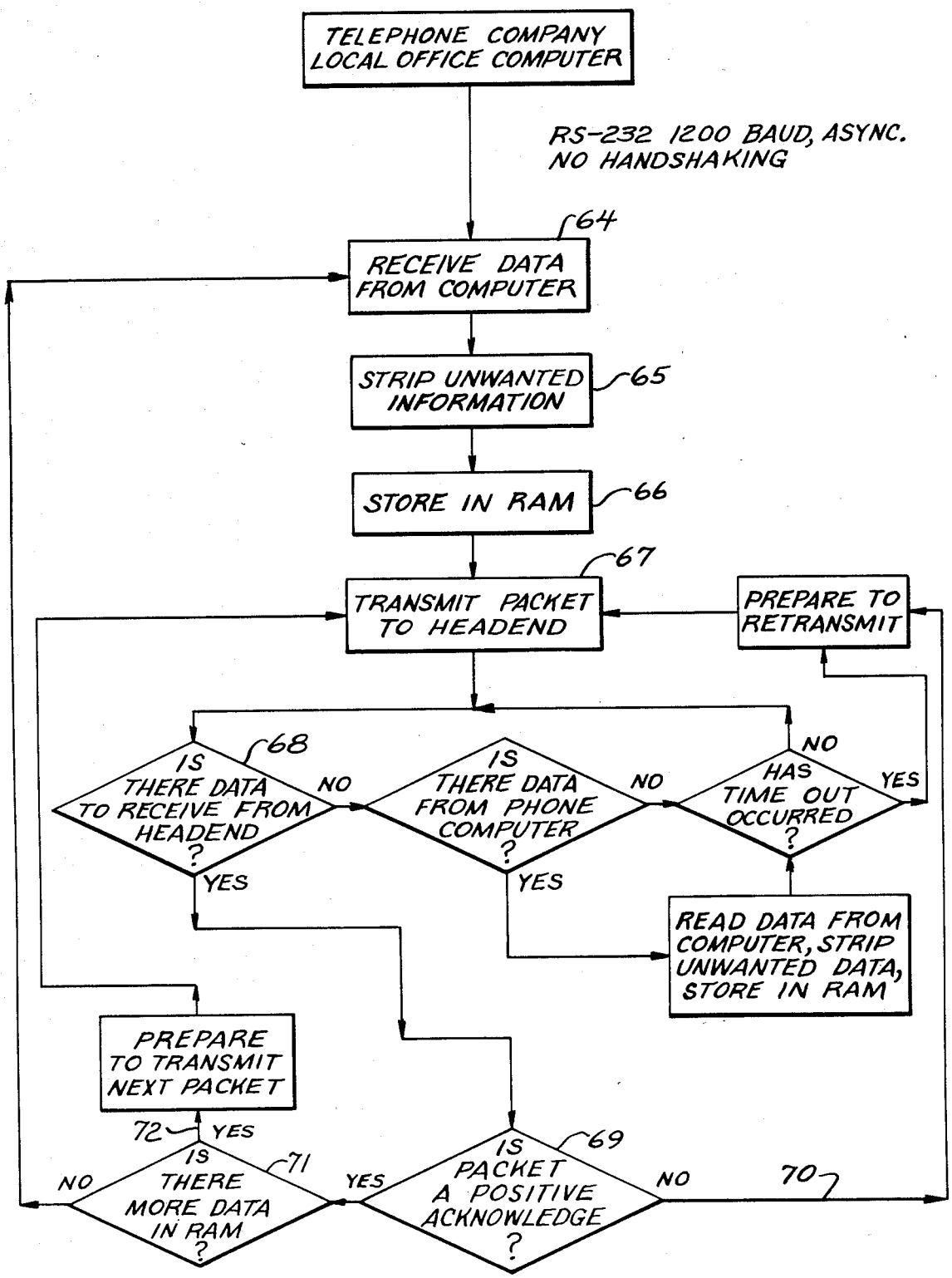

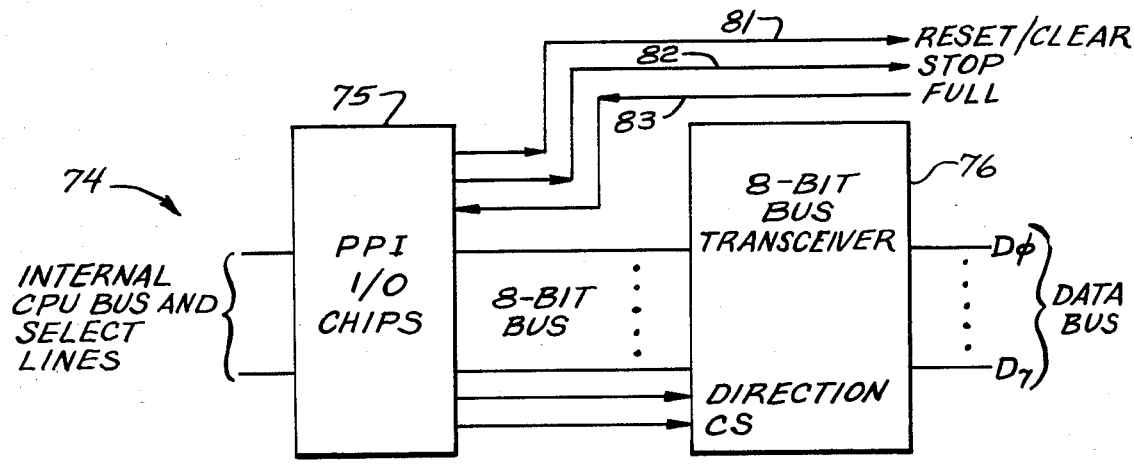
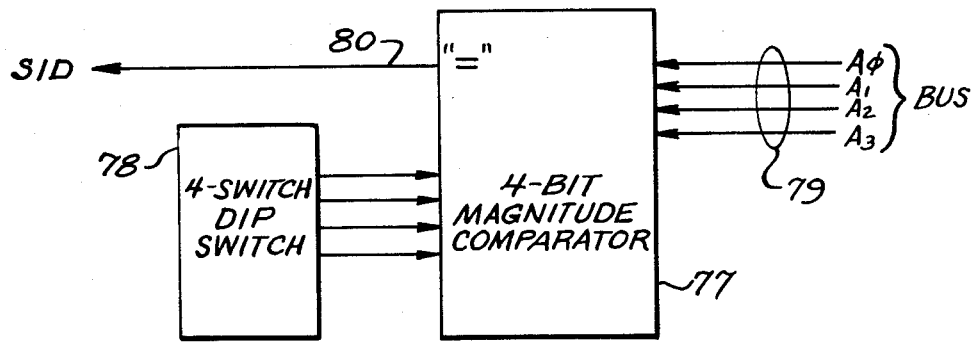
FIG. 4B

OSC & SELECT LOGIC

BUS INTERFACE CONTROL & BUFFER LOAD LOGIC

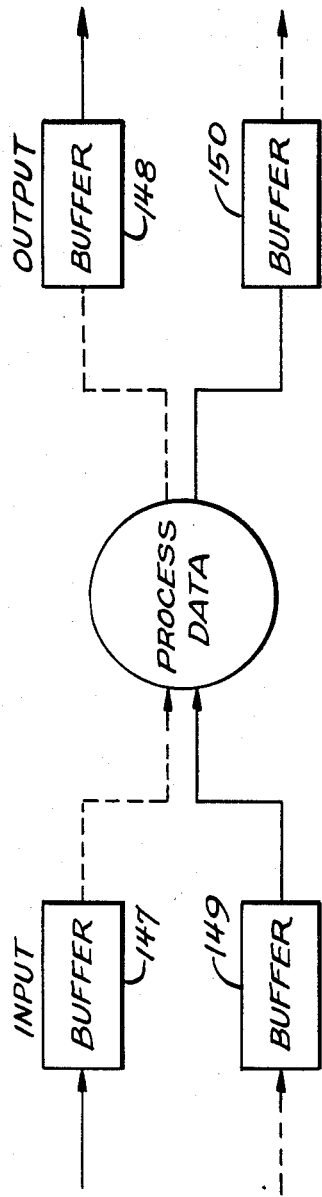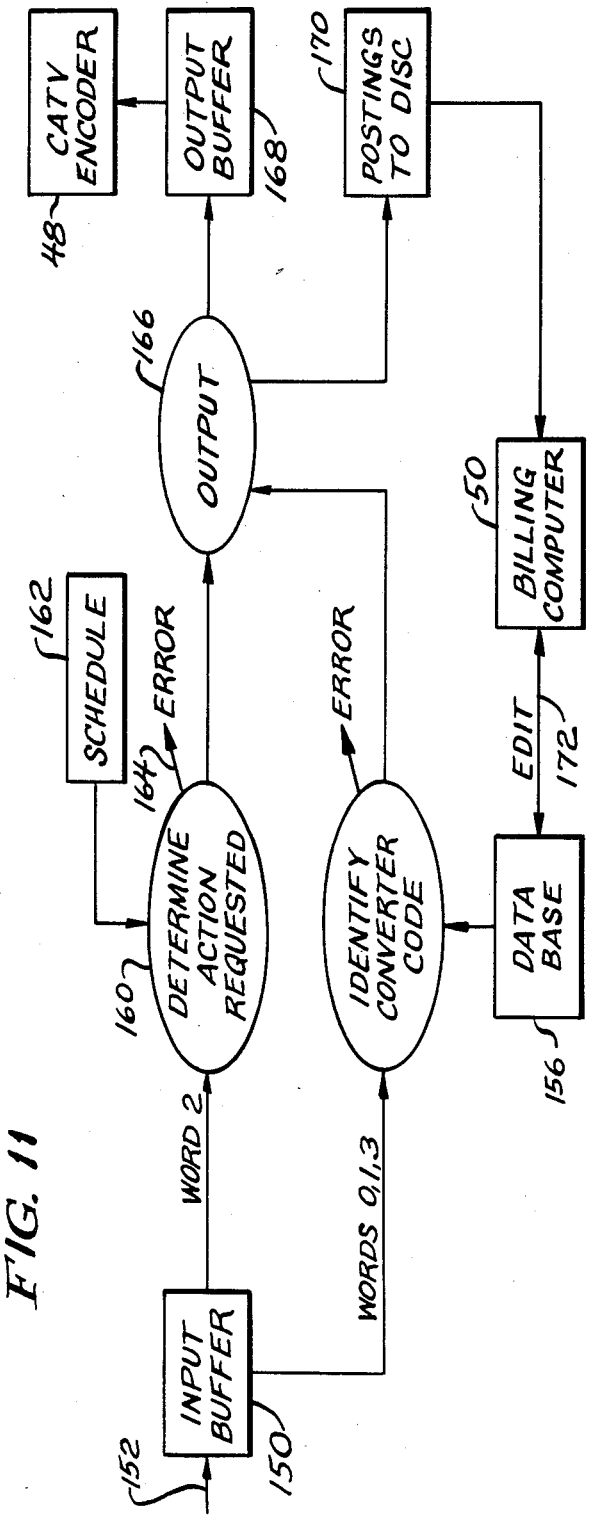

ADAPTIVE WINDOW MULTIPLEXING TECHNIQUE

BACKGROUND OF THE INVENTION

The present invention relates to cable television and particularly to a technique whereby a cable subscriber can send a request via telephone to the cable operator to receive only a selected cable program. This is known as an "impulse pay per view" system.

The preferred embodiment of the present invention is compatible with one-way addressable CATV systems. Prior to describing the invention, it will be useful to have a rudimentary understanding of a typical one-way addressable CATV system. In use, a cable operator at a "headend" station receives signals via satellite, microwave, and super trunks, encodes the signals, modulates them, and provides them to the cable plant. The cable plant is a distribution network typically carrying up to 80 channels or move over a distance of up to 20 miles or so to various subscribers. Each of the cable subscribers is provided with a one-way addressable converter (also called a decoder) which is connected to the cable and to a television receiver or monitor. The basic function of the converter is to interface the cable signals with the subscriber according to authorization codes received from the headend. The subscriber will select a channel containing a program desired to be viewed. The converter will determine whether that channel or program on the channel is authorized for viewing by the subscriber. If so, the converter descrambles the selected signal provided by the cable operator and provides a descrambled signal to the television receiver or monitor. The scrambling may, for example, be done by sync suppression wherein sync information is randomly suppressed, as well as video inversion.

To achieve the foregoing system, use may be made of the vertical blanking interval, e.g., line numbers 10, 11, 12 and 13, or an out-of-band data channel during which information can be transmitted by the headend station to the subscribers or any selected subscriber. Each converter has a respective unique address code illustratively having 20 binary bits so that over one million subscribers can be individually addressed by the headend. Additionally, each converter typically includes a random access memory (RAM) whixh is capable of storing 20 bits, for example. Each of the stored bits is representative of a service or channel which may be subscribed to. Typically, at installation, the RAM is loaded with all zero bits. When the subscriber chooses the services he wants, that information will be entered as data in a subscriber data base. The subscriber data base is accessed by a system controller at the headend station which is capable of addressing any or all of the converters in the field. The system controller also communicates with a billing and management computer.

More particularly, in this example the system controller transmits a selected 20 bit address code (sometimes referred to as an "identification code") followed by an associated authorization code using each of line numbers 10, 11, and/or 12 in the vertical blanking interval. Each converter receives the 20 bit address code, but only one converter will decode it as matching its own unique address. Following the transmitted 20 bit address code are the five bits of the authorization code. These five authorization bits will be loaded into a proper location in the RAM, the location having been determined by information from line 13 in the prior field. The RAM in the converter will illustratively contain 20 bits arranged in four groups which may be called row A, row B, row C, and row D. Illustratively, the five bit authorization code will be loaded into one of the rows of the RAM. Line number 13 of the vertical interval is used to transmit a "program tag," a "market code," and further information to the converters in the field. The market code is used to prevent a converter from being taken from one cable market to another market. The transmitted program tag is used to identify a particular channel or program and is compared in the addressed converter with the stored authorization bits to establish whether that converter is authorized to descramble the corresponding program material. Illustratively, this is done by performing a logical AND operation between the 5 bit program tag transmitted on line 13 of the channel which has been selected by the subscriber with the content of a selected row of the RAM. The result of this logical operation will indicate to the converter whether the selected channel or program on the channel has been authorized to be descrambled by the converter. It will be appreciated that each of the channels transmitted by the cable operator has its own respective program tag. This particular system has exceptional versatility in that the contents of the RAM at any subscriber's converter can be changed instantly via the system controller through the transmission of the appropriate address code during the vertical blanking interval followed by updated information for storage in the RAM. Moreover, there can be tiers of authorization wherein various programs on a given channel will be authorized for some subscribers but not for others, depending on the service to which they have subscribed. For further information about one such addressable system, refer to Ensinger and Hendrickson U.S. Pat. No. 4,460,922, whose disclosure is hereby incorporated, which patent is owned by Zenith Electronics Corp.

To date, the market penetration of cable systems has been on the order of only 50 percent. Some television owners prefer not to pay the monthly charges for cable service to receive one or more of the packages or services provided by the cable operator. These non-subscribers, however, may be willing to pay the cable operator for only an occasional program. Such type of service is called "pay per view". In order to achieve this and to provide control over billing, the cable operator must have information regarding what programs are desired by various subscribers. In an addressable CATV system of the type described above, for example, a particular subscriber's converter may be updated so that it will descramble a given program—once it is determined that the subscriber is willing to pay for that program. This can be done by having the subscriber telephone the cable operator in advance of the program to be purchased, mail a postcard, or communicate by some other means.

The problem with this type of service, however, is that it precludes impulse purchases and simultaneous response from the time the pay-per-view subscriber determines he wishes to purchase a particular program and the time it is actually viewed by him. It would be considerably more advantageous to permit a subscriber to obtain immediate results by, for example, pushing a button. This would alert the cable operator to a request for service. The system controller at the headend station immediately would change the contents of the RAM at that subscriber's converter to permit the selected program to be descrambled. This is called "impulse pay per view" (IPPV) service.

The problem facing the industry is how to provide a system permitting IPPV service. In 1975, the Federal Communications Commission mandated that all cable systems being installed would be required to have two-way communications capability. This would permit interaction between the subscriber and the headend station. To date, about 20 percent of installed systems are capable of two-way communications, and of these only about one-half have active two-way communication. With two-way communication, the subscriber can use his home terminal or other unit to communicate with the headend station and achieve IPPV. The problem, however, resides in providing a mechanism for other subscribers served by one-way cable systems, which constitute the vast majority, to have IPPV service.

For cable subscribers without two-way cable systems, a hydrid system is required for impulse pay per view service. This involves a telephone request by a subscriber for a PPV cable event followed by delivery from the cable operator headend station to the individual subscriber of a new authorization level permitting the PPV cable event to be descrambled.

The problem with hybrid systems using the telephone is substantial. The telephone system in a given city or community includes one or more central offices, each communicating with up to about 50,000 telephone subscribers. Each of the several central offices communicates with the others by trunk cables. The headend station of the cable operator will be located within a region serviced by one central office. When cable subscribers telephone for pay per view service, their telephone central offices will route all of the telephone calls to the one central office servicing the headend station. Too many telephone requests at the same time to the cable operator can cause the telephone central office to "crash" due to excessive requests for physical telephone connections between numerous telephone subscribers and a single cable operator headend station. This problem is common to all hybrid systems, whether a manual telephone system or an automatic dialing system is used.

Further problems attend manual call-in systems and auto-dialing systems. The manual call-in systems are labor intensive, require long processing and holding time, have limited capacity, are not impulse in nature, and have lower penetration. They also involve possible human error. Auto-dialing systems have an advantage over manual systems, except that there is the additional expense of in-home installation of the automatic dialer.

To avoid overloading on the telephone system, one solution to providing IPPV service for one-way addressable cable systems would be to refrain from making physical telephone connections between the cable subscribers and the headend station through the various central offices. To achieve this, a new system based on automatic number identification passing referred to as "ANI passing" has been developed. ANI passing is an upgrade achieved by adding software to some central offices or by adding hardware to others, depending on their existing capabilities. In ANI passing, the central office of the telephone company will collect information based on each subscriber telephone call and pass it on to other equipment.

Thus, when a cable subscriber intends to make an IPPV request and picks up his telephone (takes it "off-hook"), a dial tone is issued to the subscriber's premises by the telephone company, and the telephone number is automatically identified, as customary within the telephone company. Now the cable subscriber can enter information using the telephone. Typically, to place a phone call, seven digits (or ten, if an area code is needed) are entered. To use ANI passing, however, some prescribed sequence of digits is used. This can take virtually any form. For example, the subscriber may enter "*85" or any other prescribed NNX number (exchange number) and then some number of digits, such as four further digits. In general, however, the total number of digits need not be seven, so long as some prescribed subscriber-entered information alerts the telephone company central office not to make a physical connection between the telephone subscriber and whatever location is identified by the code which follows the reserved block of codes which follows the NNX (or *85 signal). After dialing the NNX number, for example, the cable subscriber will provide further information on the telephone by sending illustratively four digits. Hence the telephone transmission to the central office may take the following form: NNX-YVVZ. In this illustrative examle, the code represented by NNX activates the ANI passing system at the central office. The remaining four digits YVVZ identify what the subscriber wants to do. Illustratively, the Y digit is used to identify the cable company. In any given metropolitan area, there will be fewer than ten different cable operators, so the one digit (Y) will be able to identify the cable operator uniquely. Illustratively, the next two digits represented by VV identify the event or cable television program which the cable subscriber wishes to purchase. Next, the Z digit may represent a password which is useful for security purposes. For example, within a given household where a cable television system has been installed, parents may, through the use of a password, prevent access by children to certain types of pay per view programming. Alternatively, the Z digit can be used for other purposes. In using "*85, five digits can be entered by the cable subscriber to his telephone, for a total of, for example, seven digits preceded by one special character. One of the digits may identify the cable company, two of the digits may identify the cable event to be purchased (or canceled), and two digits may be used as a password. It will be understood that these are purely illustrative, and that wide variation can occur.

As mentioned, the NNX or *85 message tells the telephone central office that it need not make a physical connection. This avoids overburdening the telephone plant. In response to receiving such an ANI transmission, the receiving telephone central office will collect and store data. Then, it will communicate by the system of the present invention with the cable headend station which has been "telephoned" and provide it with various information, including the telephone number of the cable subscribers who called, the user entered data, and various other information. In an area served by plural cable companies, the equipment at the telephone company central offices will send data, using the present invention, to the plural cable companies.

The object of the present invention is to provide a system which will receive information from the telephone company central offices and implement the impulse pay per view requests by cable subscribers in a satisfactory manner.

A related object of the invention is to provide a system having the ability to receive data from the telephone companies as fast as the information can be provided using the ANI passing systems.

Another object of the present invention is to permit the authorizations of the subscribers to be checked in real time.

A further object is to translate the telephone number of the cable subscriber (provided by the telephone company) into a cable subscriber code at a fast rate.

BRIEF DESCRIPTION OF THE DRAWINGS

In describing the various aspects of the present invention, reference will be made to the accompanying drawings wherein:

FIG. 3 is a flow chart of the TCU software;

FIGS. 4A and 4B are diagrams of the telephone communication controller (TCC) located at the cable headend station.

FIG. 10 shows the phase inverted synchronous input/output buffer system used in the system controller;

FIG. 11 is a sketch illustrating processing by the system controller, CATV encoder, and billing computer;

DESCRIPTION OF THE PREFERRED EMBODIMENT

Figure 1:
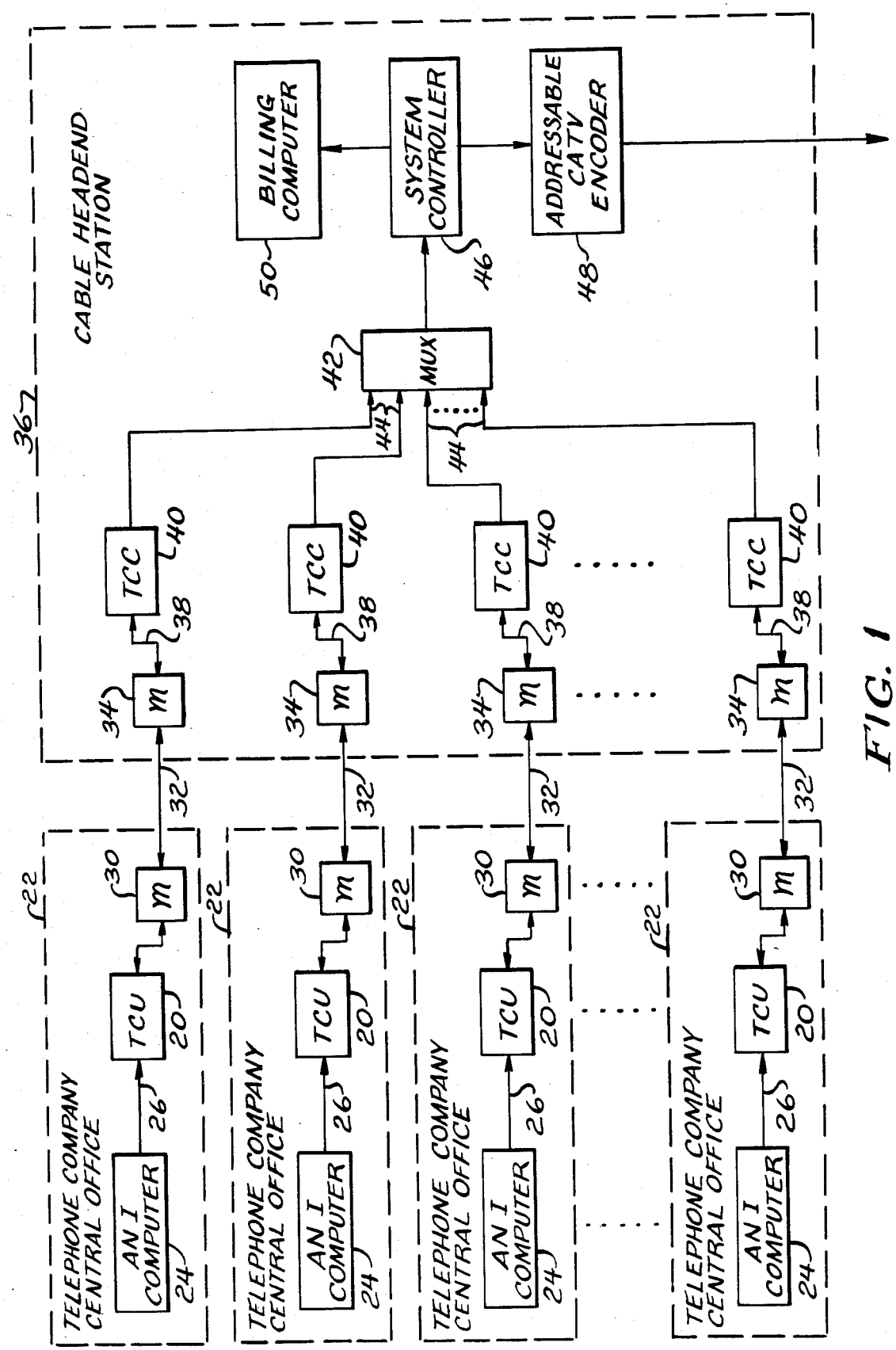
FIG. 1 is a block diagram of a system according to the present invention showing plural central offices and a headend station.

FIG. 1 shows a block diagram of a system according to the present invention. The preferred embodiment of the invention is the Zenith PHONEVISION system. As shown, the system comprises a plurality of telephone communication units (TCUs) 20 each located at a corresponding telephone company central office 22. Several central offices 22 are shown in FIG. 1 to indicate the several central offices of any metropolitan area. In the preferred embodiment of the present invention there may be as many as sixteen central offices. Also located at the telephone company central office is an automatic number identification (ANI) computer 24. The ANI computer is provided by the phone company and is activated upon receipt of a telephone call from a customer utilizing a special ANI telephone code. The ANI computer then provides specific information to its TCU on a cable 26.

Coupled to each telephone communication unit 20 is a corresponding modem 30. Modems 30 are coupled via leased telephone lines 32 or other communication channels to corresponding modems 34 located at a cable headend station 36. Each modem 34 is coupled by a cable 38 to a respective telephone communication controller (TCC) 40. The TCC's 40 are in turn coupled to a multiplexer 42 by a bus 44. Multiplexer 42 selects which one of the TCCs corresponding to the various telephone company central offices will supply data to a system controller 46. The system controller in turn is coupled to a cable TV encoder 48 as well as a billing computer 50.

In order to utilize the impulse pay per view system of the preferred embodiment described herein, a cable television subscriber would tune his addressable cable television decoder to the desired channel. The cable subscriber would then use his telephone to enter the ANI telephone code and then four or more digits. Two of the digits entered by the cable subscriber signify the particular IPPV cable event the subscriber wishes to view. Two of the other digits for illustrative purposes constitute a password number or could be used to identify which of a plurality of encoder units the subscriber wishes to enable for the desired cable event.

The telephone company central office 22 serving the cable subscriber's telephone area will be alerted by the ANI code so that when it receives the call, it will transform the "dialed" phone number (called the "destination telephone number") and other data into the so-called bulk calling line identification (BCLID) format by using the ANI computer. It will be understood that other protocols can be used by the telephone company, and that the present invention is not limited to the specific protocol adopted. In any event, the telephone company central office will not connect the incoming call from the cable subscriber to its local switch. Thus, the telephone company central offices will not become overburdened with the incoming calls from nunerous cable subscribers who may all be calling on impulse to purchase a particular cable event.

The ANI computer at the telephone company central office will send the BCLID data (using seven bit ASCII code) to the TCU 20 located at the central office. The data is sent serially at 1200 baud in RS-232 format. The BCLID message contains ASCII characters representing the seven digit "destination telephone number," the ten digit origination telephone number, as well as considerable other data such as carriage return and line feed, a BCLID input/output message identifier, numerous ASCII spaces, the time of day in hours, minutes and seconds, the terminating line status and the calling line status indicator. The data sent in the telephone company's BCLID format is shown in Table I.

The "destination telephone number" carries the information entered by the cable subscriber. This will include the cable event which is to be purchased and the password. Ordinarily, this will comprise the last four of the seven digits entered by the subscriber, although any number of digits could be entered, and of these, any nunmber could be dedicated to identifying the program to be purchased, a password, an identifier of which particular converter box at the subscriber's premises is to be used, and any other information deemed necessary or desirable by the cable company.

TABLE I

Format of BCLID Message Sent
By ANI Computer 24 to TCU 20

\<cr-lf\> BCsaabbccssddddddddsooooooooooosfsgs \<cr-lf\>

\<cr-lf\>     - All messages start and stop with carriage

TABLE I-continued

Format of BCLID Message Sent
By ANI Computer 24 to TCU 20

<cr-lf>BCsaabbccssdddddddsoooooooooosfsgs<cr-lf>

|  | return line feed |
| --- | --- |
| BC | - BCLID I/O message identifier |
| s | - ASCII "space" |
| aa | - Hours (24 hour format) |
| bb | - Minutes |
| cc | - Seconds |
| ddddddd | - 7-digit "destination telephone number" |
| oooooooooo | - 10-digit origination telephone number |
| f | - Terminating line busy, idle status, ("0" = idle, "1" = busy) |
| g | - Calling line DN multi-status indicator |

This data is sent by the ANI computer 24 to its corresponding TCU 20 asynchronously without handshaking, and can be a continual data stream.

The TCU 20 must be able to receive and transmit the data as fast as the ANI computer 24 can send it. To promote speed, each TCU 20 strips away unneeded data and temporarily stores the remaining data in a buffer. The stored data is then transmitted synchronously to the cable headend station using a telephone line 32. Preferably, a contracted synchronous data link control (SDLC) protocol is used for transmitting the data from each TCU 20 to its corresponding TCC 40 at the cable headend station. After the data has been transmitted to the headend station, the TCU 20 waits for an acknowledgment message from the headend TCC 40 before transmitting the next data packet. If no acknowledgment or a negative acknowledgment message is received, TCU 20 retransmits the previously transmitted data packet. The TCU 20 provides for error free transmission to TCC 40 with no data loss. Since much of the unnecessary information of Table I is removed, as will be described, by the TCU 20, and due to the buffering occurring at each TCU 20, each TCU 20 is able to operate at a rate fast enough to keep up with ANI computer 24. Each TCU 20 also provides for the conversion of the BCLID data received from the phone company to the modified SDLC protocol format.

Figure 2:
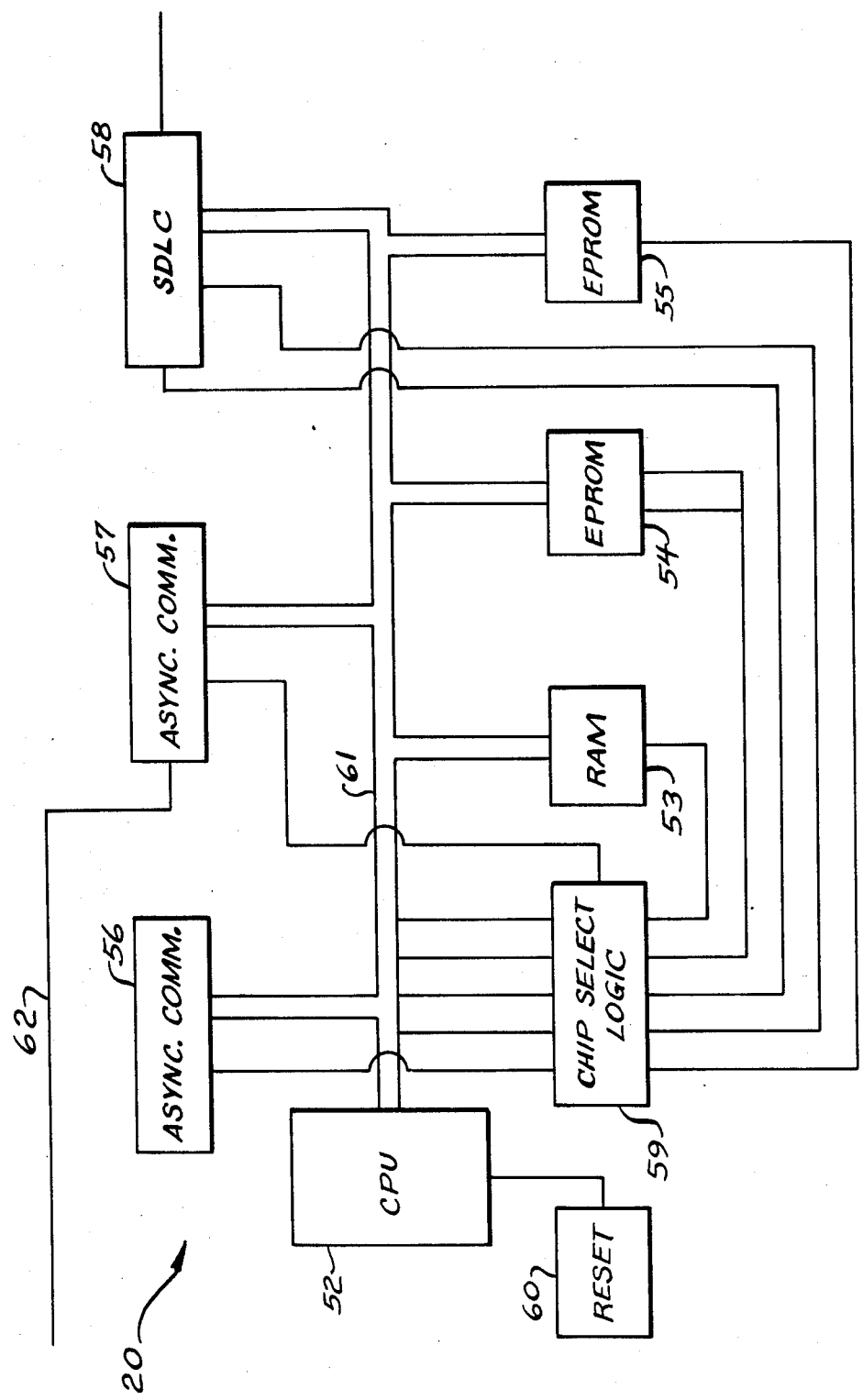
FIG. 2 is a block diagram of one of the several telephone communication units (TCUs)

A block diagram of a TCU 20 located at one of the telephone central offices is shown in FIG. 2. It includes an Intel 8085 central processing unit ("CPU") 52, a 4k×8 static RAM 53, a 16K×8 EPROM 54, a 4k×8 EPROM 55, two Intel 8250 Asynchronous Communication Elements 56, 57, an Intel 8273 programmable HDLC/SDLC protocol controller 58, chip select logic 59 and watchdog reset circuitry 60. A sixteen bit address and eight bit data bus 61 provide communication among the various components of TCU 20. The serial data from the telephone office ANI computer 24 is applied to a serial data input pin of communication element 57 by a line 62 which is coupled to cable 26 through a line receiver (not shown). The equipment on this board, according to the preferred embodiment, has two asynchronous channels and one synchronous channel.

The CPU 52 in the preferred embodiment illustratively operates at four megahertz. Its instruction code is stored in EPROM 54. The EPROM 55 may contain look-up tables. RAM 53 is used to buffer data packets, for stack purposes and for program use. Chip select logic 59 is used to determine whether the read or write operation is required of the memory mapped devices and to determine the exact device being addressed.

As mentioned, once the data from the telephone office ANI computer 24 is received, TCU 20 strips away unwanted data. The data that is kept is the seven digit (illustratively) "destination telephone number" entered by the cable subscriber (which includes the data the cable event to be purchased), the ten digit phone number of the cable subscriber, the terminating line status and the calling line indicator. These nineteen characters are ASCII characters, and are temporarily stored or buffered in RAM 53 to await transmission to the corresponding TCC 40 at cable headend station 36.

FIG. 3 contains a flow chart of the software which controls the inputting of data from the telephone office ANI computer 24 and the outputting of data to the cable headend TCC 40. A listing of the TCU software is contained in Appendix I. Referring to FIG. 3, after data is received from ANI computer 24 at block 64, unwanted data is stripped, temporarily stored, and then sent in packets to the headend unit as shown at blocks 65, 66 and 67. Then TCC 20 determines at decision diamonds 68 and 69 whether a positive acknowledgment has been received from the headend. If not, retransmission of the data packet occurs, as indicated by route 70. If there is stored data in RAM 53, determined at diamond 71, further data packets are sent to the headend, as indicated by route 72. Otherwise, data continues to be received, as always, and put into a buffer (RAM) until processed.

The nineteen ASCII characters sent by TCC 20 to its TCC 40 are sent via a line using a contracted SDLC protocol which is reflected in Appendix I. Briefly, however, the SDLC protocol is modified to preserve the package format, zero bit insertions, and the frame check sequence ("FCS code"), with all else eliminated. The data is sent synchronously, serially, at 1200 baud, and is RS-232 compatible. Handshaking is used, so that for every packet sent from the TCU 20, a positive acknowledgment is required in the preferred embodiment before the next packet is transmitted. Table II shows the illustrative message format of the data sent from a TCU 20 to its TCC 40. Table III shows the illustrative acknowledgment message sent from a TCC 40 to its corresponding TCU 20.

TABLE II

Message Sent From
The TCU To The TCC

[address] [packet ID]NNXDDDDAAACCCCLLLYZ[FCS] [FCS]

[ ] denotes an 8-bit quantity
address = FF hex
NNX = ANI identifier, e.g., *85 or 1st 3 digits of
destination phone no.
D = User data
A = Area Code
C = First 4-digits of subscriber's phone number
L = Last 3-digits of subscriber's phone number
Y = Terminating line status (line busy or not)
Z = Calling line indicator (public line or private
branch exchange)
[FCS] = Frame check sequence for error checking

TABLE III

Acknowledgment Message
Sent From The TCC 40 To The TCU 20

[address] [packet ID] [acknowledgment byte] [FCS] FCS]

acknowledgment byte = C3 hex for NACK
= A5 hex for ACK
[ ] denotes an 8-bit quantity It will be understood that these processes occur at each of the several central offices of the telephone company serving the cable companies areas. The system as described so far collects data in real time. The collected data are the requests of subscribers, and this is achieved using a system compatible with ANI passing. Data is sent from multiple telephone central offices to a cable headend station. The data provided includes the subscriber's telephone number and his request, which is couched in the destination telephone number.

Turning now to the cable headend station 36, the basic functions of each TCC 40 in the preferred embodiment are to receive data packets from the several telephone central offices 22, store the data temporarily, perform some conversions into binary and BCD, reformat the data, and communicate it quickly to system controller 46 via temporary storage in multiplexer 42. As seen in FIG. 1, there are several TCC units 40 corresponding to the several telephone central offices 22.

Figure 4A:
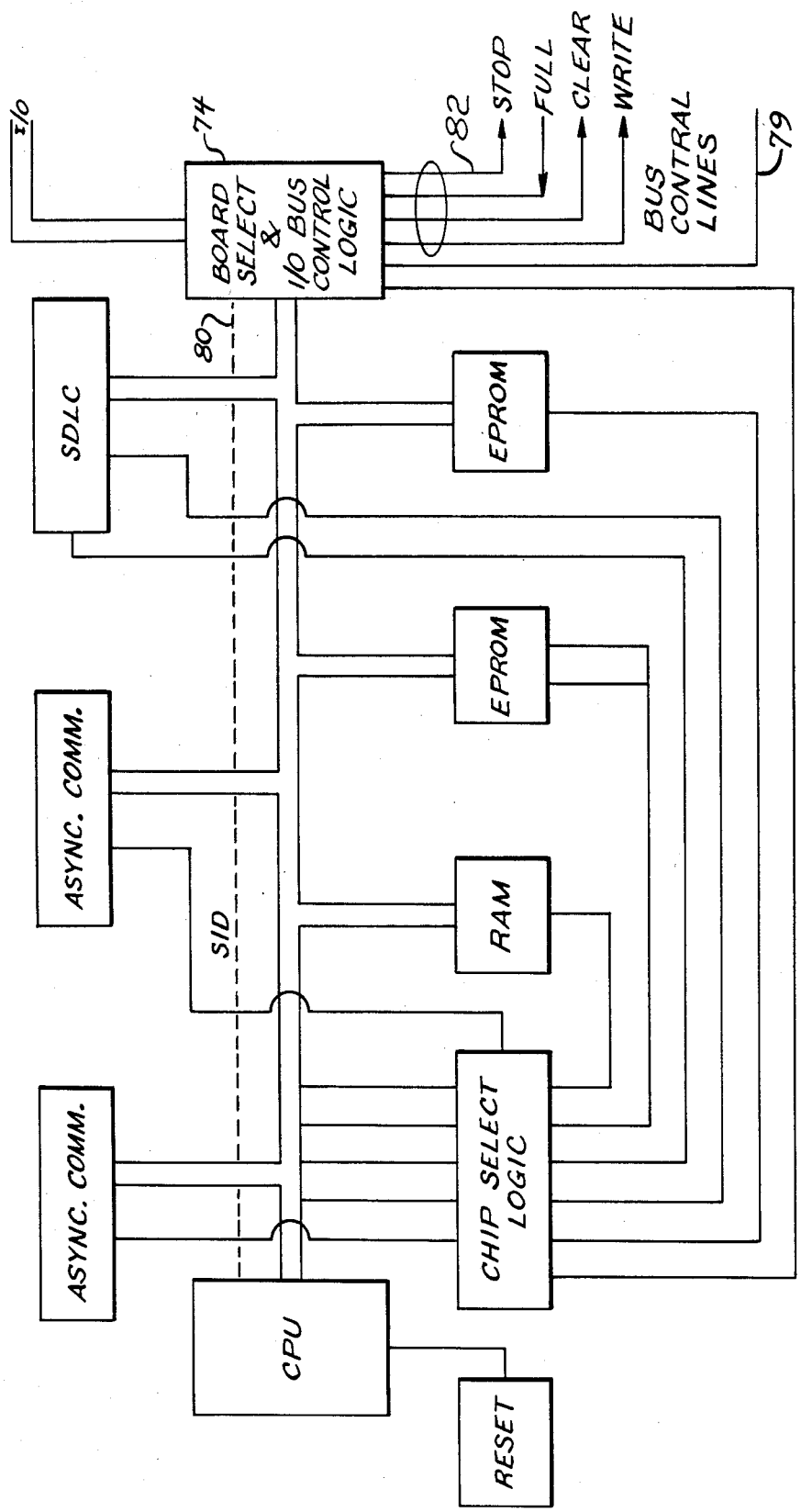

A block diagram of an illustrative TCC 40 located at the cable headend station 36 is shown in FIG. 4A. The same components are used in the TCC 40 as in the TCU 20, and in the same configuration. As with TCU 20, this board has asynchronous and synchronous capability. In TCC 40, the synchronous port of the 8250 chips are used. Each TCC 40 additionally includes a board select and I/O bus control logic circuit 74 shown more particularly in FIG. 4B. This circuitry illustratively comprises two Intel 8255 programmable peripheral interface (PPI) chips represented by 75, an eight bit transceiver 76, a four bit magnitude comparator 77 and a four pole DIP switch 78. Switch 78 is used to set the select address of the particular TCC. For example, the first TCC would have all four poles of the switch arranged so that each outputs a logic "0." The switch outputs are connected to one side of the magnitude comparator, and the other side of the comparator is coupled to four board select lines 79 coupled to multiplexer 42. When comparator 77 sees a match in its two inputted values, it generates a match signal that is inputted via a serial input data (SID) line 80 to the CPU of FIG. 4A alerting it that the TCC board is being offered the opportunity by multiplexer 42 to output data.

The I/O control logic part of circuit 74 handles the outputting of eight bit parallel data sent to multiplexer 42. In order to transfer data from TCC 40 to multiplexer 42, a check is made to ensure that multiplexer 42 is ready to receive a data byte. Then transceiver 76 (FIG. 4B) is enabled by the one of PPI chips 75. The data to be transferred is then written into the same PPI chip. If multiplexer 42 is ready, the data byte is strobed into the multiplexer by performing a write operation. Four bus control lines 81, 82, 83 and 84 (CLEAR/RESET, STOP, FULL, WRITE) are used to check if the multiplexer is ready for data and to strobe the data into the multiplexer.

Figure 4C:
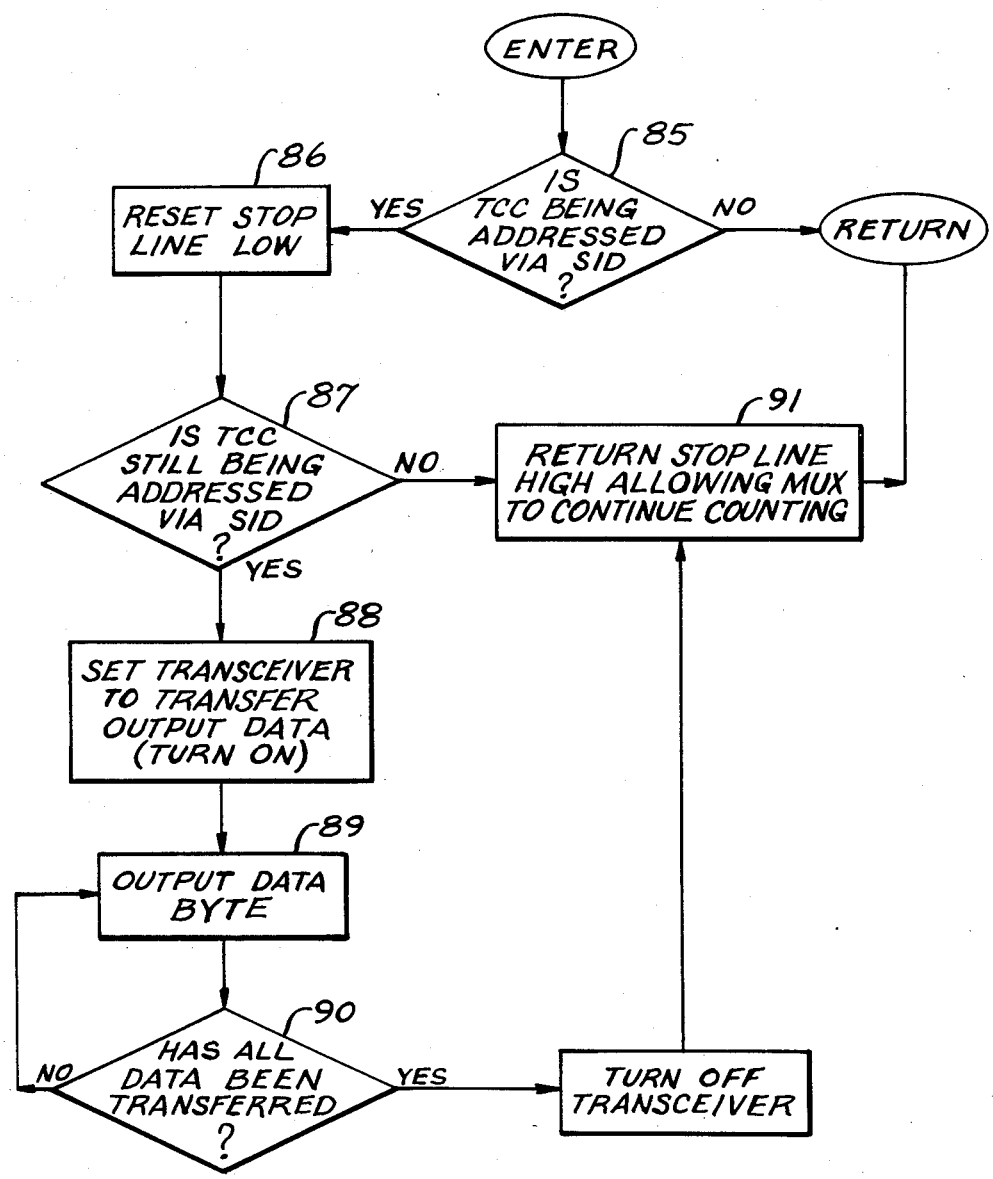
FIG. 4C is a flow chart of part of the TCC operations pertaining to adaptive window multiplexing.

This process can be referred to as part of what is referred to herein as "adaptive window multiplexing" wherein multiplexer 42 addresses in sequence each of several TCCs 40, any of which may or may not have data to output. However, the time allotted to any one TCC is not fixed, as in conventional multiplexing. For the most part, the time taken by any single TCC 40 depends on how much data, if any, needs to be sent from that TCC 40 to multiplexer 42, subject to limitations of the memory used for buffering in the multiplexer, as described infra. Referring to FIG. 4C, multiplexer 42 provides address outputs in sequence. The CPU on each TCC 40 looks for its own address (i.e. the address of its board) being issued by the multiplexer, as indicated by diamond 85. The CPU will know whether it has any data (stored temporarily in RAM) to send. If there is such data, then when the CPU sees its address issue, it will stop multiplexer 42 from progressing to the address of the next TCC in sequence by bringing the STOP line 82 low, indicated at block 86. A short time later (interposed for example by the execution of a few instructions), the CPU on TCC 40 checks to make sure that the address at which multiplexer 42 did stop is indeed the address of this particular TCC 40 (diamond 87). If so, then the CPU will cause a fast data transfer (at a rate of 56K bytes/sec) to the multiplexer (block 88, 89, 90). If the address is wrong, then the CPU will release STOP line 82, and thereby multiplexer 42, and not send data (block 91). This is a double check to ensure that only one TCC 40 sends data to the multiplexer 42 connected to bus 44. In FIG. 4B, bus 44 comprises lines 79 and 81 to 84.

Figure 5:
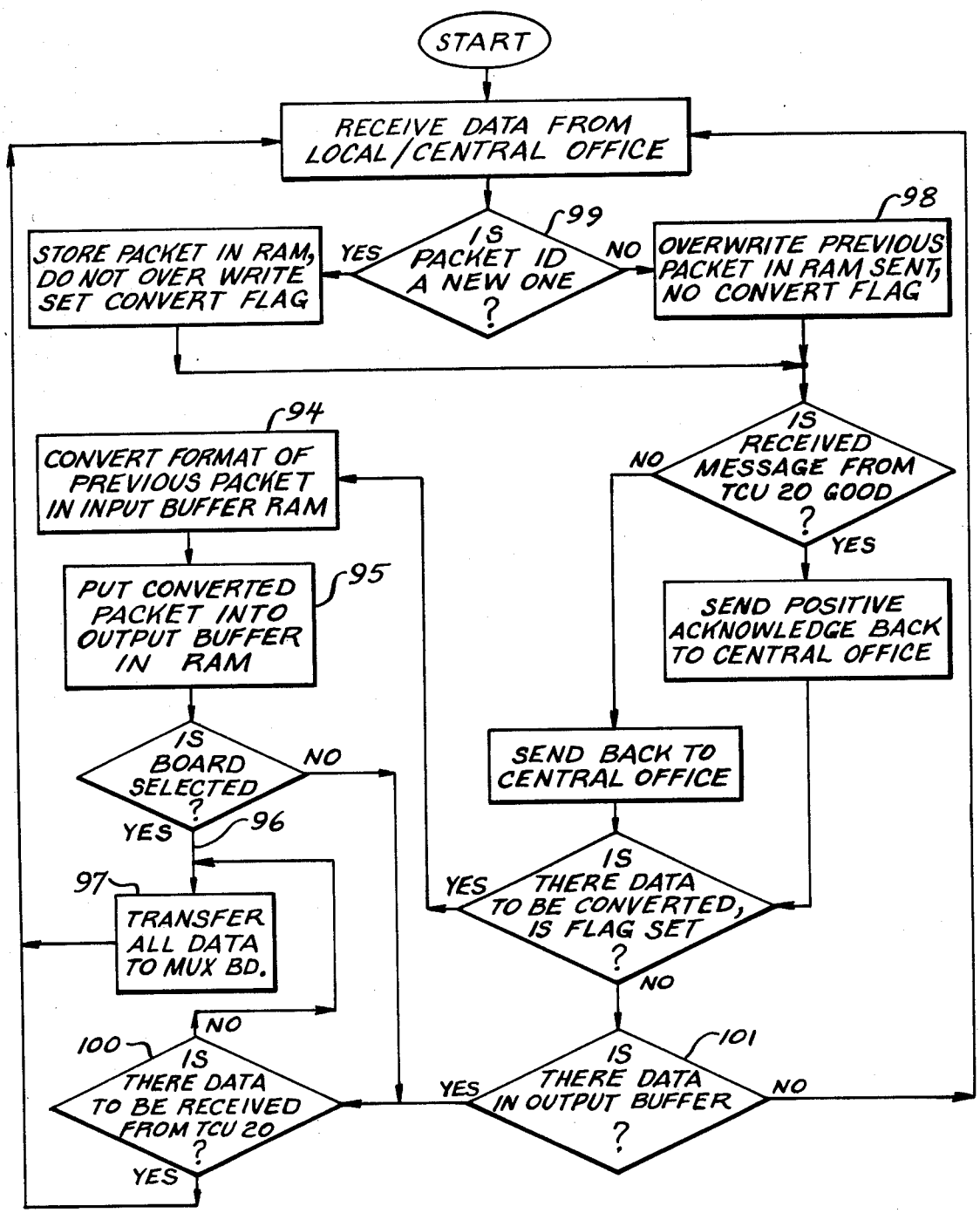
FIG. 5 is a flow chart of the TCC software.

As stated, each TCC 40 has circuitry 74 not included in any of the TCUs 20. While each TCC 40 uses different software than the TCUs, both the TCU and the TCC program is stored in the 16K×8 EPROM, and the 4K×8 RAM is used to buffer data, for stack purposes and for program use. The RAM has a portion which is used as an input buffer and another portion used as an output buffer. A flow chart of the software used in the TCC of FIG. 4A is shown in FIG. 5. A listing of the TCC software is contained in Appendix II.

An important function of each TCC 40 in the preferred embodiment is to convert the ASCII data received from its corresponding TCU 20 into a format more readily usable by the system controller 46, which preferably is a Hewlett-Packard HP-1000 computer. The conversion occurs at block 94 of FIG. 5. The last three digits of the originating phone number (LLL in Table II) are converted into a ten bit binary number. The first four originating digits (CCCC in Table II) are converted into a fourteen bit binary number. The area code of the originating phone number is converted into a two bit binary number (it being assumed that no more than four area code regions are covered by the several telephone central offices which serve the subscribers of the cable operator). The numbers entered by the cable subscriber (DDDD in Table II) representing the cable event and the password are converted into binary coded decimal (BCD) values.

The following example illustrates the novel conversion of a three digit ASCII number to a ten bit binary number. In this example "h" following a number indicates that hexadecimal base is used and "d" indicates that the number is a decimal number. The number to be converted is 0110100 (34h) 0110011 (33h) 0110010 (32h), i.e. 432d. The least significant ASCII digit (i.e., the decimal "2" in the "ones" decimal column) is converted into its binary equivalent by subtracting 30h from the digit: 32−30=02h. The second ASCII digit (the next most significant digit, i.e. the "3" in the "tens" column) is then converted to binary with tens-place weighting. This is converted to binary as in the previous conversion, i.e. 33h−30h=03h. Then the base address of a look-up table stored in an EPROM in TCC 40 for the tens units is added to this value in order to find an address in the look-up table. Then, using this address, a value is obtained from the look-up table. For the number 03h in the tens place, the value read from the look-up table is 1Eh (30d). This is a weighted conversion process. The same weighted conversion process is used for the third ASCII digit, but with different weighting. For 04h (34h−30h) in the hundreds place, the look-up table value is 190h (400d). The hexadecimal values are then combined: 190h+1Eh+02h=1B0h (432d). The conversion process for a four digit ASCII number is similar to the process explained above except, of course, thousands-place weighting is also used.

The following is an example of a conversion of a three digit ASCII value area code to a two bit binary number. In this example "b" following a number indicates that the number is in binary, and again "h" indicates hexadecimal. The area code to be converted is 33 31 32, i.e. 312d. The first ASCII digit is converted into a hexadecimal value by subtracting 30h (32h−30h=02h). The second digit is converted in the same manner (31h−30h=01h=00000001b) and this value is rotated left four places (00000001b→00010000b). The first and second values are then combined, and stored in a register of the CPU of the TCC 40 (00000010b+00010000b=00010010b=12h). The third ASCII digit is converted into a hexadecimal value to which the look-up table base address (F0h) is added (33h−30h=03h; 03h+F0h=F3h). The sum value is stored in a CPU register. The first and second register pair (F312h) contains the address where the desired two bit value is found corresponding to the 312 area code.

After the ASCII numbers are converted into the appropriate form, they are stored (block 95 of FIG. 5) in the output buffer portion of the on-board RAM of TCC 40 until multiplexer 42 indicates that it is ready to receive data (indicated at 96). In addition, the data to be sent to the multiplexer is arranged in a particular format by the TCC 40 before it is transferred. This is done so that when the data is eventually sent to system controller 46, it will be able to process the data without excessive manipulation. The format of the data sent to multiplexer 42 is shown in Table IV. As can be seen, the data is transferred (block 97) in eight bytes, each byte having eight bits. Note that byte 1 contains the two bit binary area code data as well as the first six binary bits of the converted last four digits of the originating phone number. Note also that zeros are inserted into a portion of byte 3 and in all eight bits of bytes 5 and 7.

TABLE IV

Data Sent To The Multiplexer From the TCC

| BYTE 1: | [(2-bit area code) (1st 6-bits of CCCC)] |
|---|---|
| BYTE 2: | [remaining 8-bits of CCCC] |
| BYTE 3: | [000000(1st 2-bits of LLL)] |
| BYTE 4: | [remaining 8-bits of LLL] |
| BYTE 5: | [00000000] |
| BYTE 6: | [8-bit event #] |
| BYTE 7: | [00000000] |
| BYTE 8: | [8-bit user pass word] |

C = One of the first 4 digits of subscriber's telephone number (now binary)
L = One of the last 3 digits of subscriber's telephone number (now binary)

Several steps are taken in each TCC 40 to ensure the reliability of data. The system overwrites (block 98) any data which is retransmitted (which can occur when a negative acknowledgment issues) (decided at diamond 99). This avoids excessive data. Note also that in this flow chart, if TCC 40 determines that data is to be received from its TCU 20 (diamond 100) then the TCC will postpone a data transfer, even if data is in the output buffer (decided at diamond 101). Thus, inputting has priority over outputting, to ensure against losing data.

The rationale is that inputted data and data ready for outputting can both be buffered. The data transfer rate on outputting is so high (illustratively 56K bytes/sec) that some delays can be tolerated to allow for inputting.

Figure 6A:
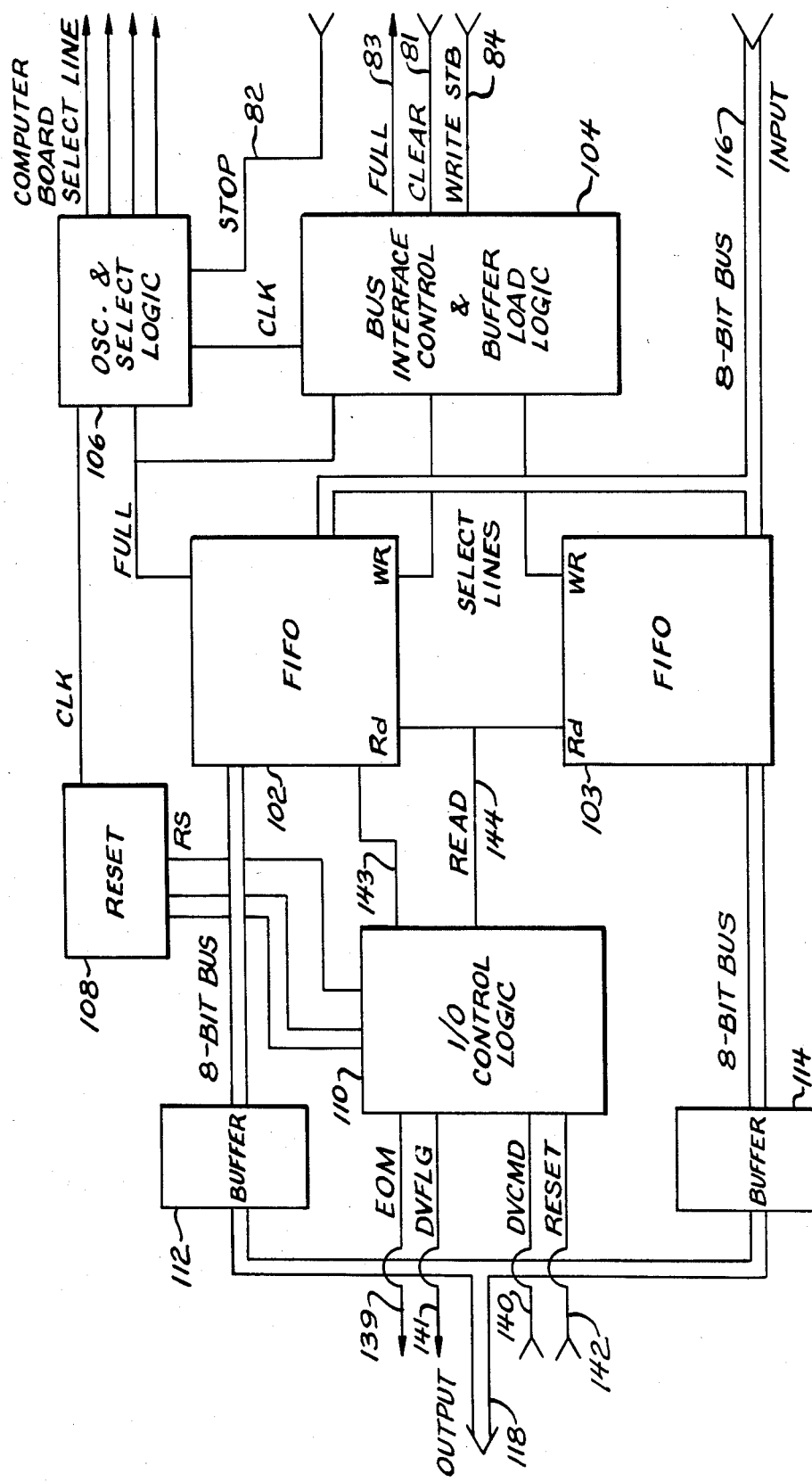
FIGS. 6A, 6B and 6C are diagrams of the multiplexer circuitry.

A block diagram of the preferred embodiment of multiplexer 42 is shown in FIG. 6A. The multiplexer performs three major functions, namely: (1) selecting one of the sixteen possible TCCs to receive data from at any given time, (2) buffering the received data until system controller 46 is ready to receive it, and (3) transferring the buffered data to the system controller.

Multiplexer 42 illustratively comprises two Mostek 4501 first-in, first-out (FIFO) dual port memory chips 102, 103, bus interface control and buffer load logic 104, oscillator and select logic 106, reset circuitry 108, input-/output control logic 110 and two output buffers 112 and 114. Data is received from TCC 40 on an eight bit data bus 116 and transmitted to the system controller 46 on a sixteen bit data bus 118.

Figure 6B:
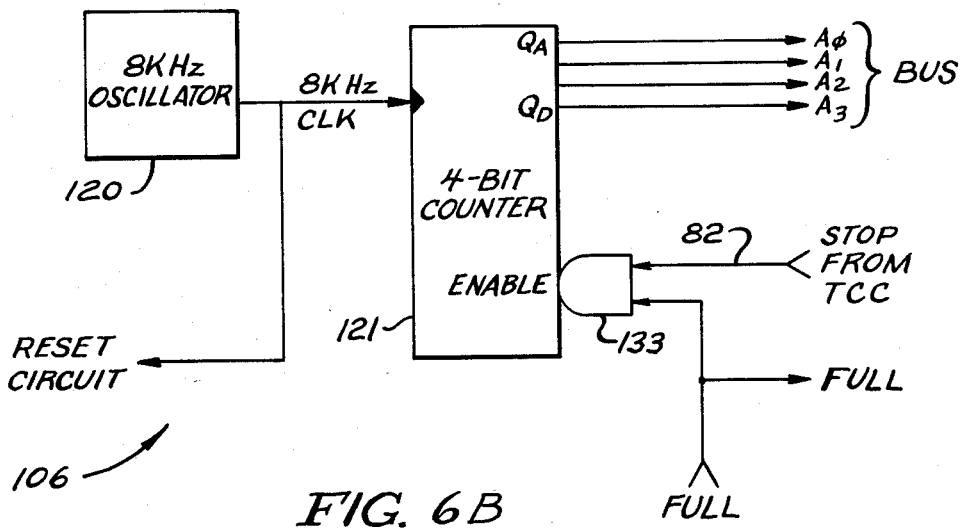

The oscillator and select logic 106, illustrated further in FIG. 6B, selects which one of the TCC units 40 data is to be received from. This oscillator circuitry may comprise a schmitt-trigger inverter with its output looped back to its input through a low-pass filter to form an 8 KHz oscillator 120 (FIG. 6). This clock signal is used to perform dummy read operations during a system controller request for reset and to increment a board select counter. The board select counter of circuit 106 is illustratively a four bit binary counter 121 with its Enable control coupled to a single stop line 122 which in turn is coupled to all sixteen of the TCC units 40. Counter 121 continually cycles from 0 to 15 until halted by any of the TCC 40 requesting a data transfer by taking stop line 82 low. Once the data transfer is completed (i.e., the output buffer portion of the RAM in the TCC of the addressed TCC has been emptied), stop line 82 is returned high by such TCC 40, and counter 121 is allowed to resume its counting in order to address the next TCC in sequence. As shown in FIG. 5, if there is no data in the output buffer of the addressed TCC (decision diamond 101), then such TCC will not seize the opportunity to write data onto the eight bit bus 116 (FIG. 6) coupled to multiplexer 42. Instead, such TCC 40 will continue receiving and processing synchronously sent packets of data from its TCU 20 and will permit multiplexer 42 to address the next TCC 40 in sequence. Thus, the length of time or the window during which data is received by the multiplexer from a particular TCC adapts according to the amount of data in the TCC output buffer available at the time for transfer, as part of the adaptive window multiplexing technique.

Figure 6C:
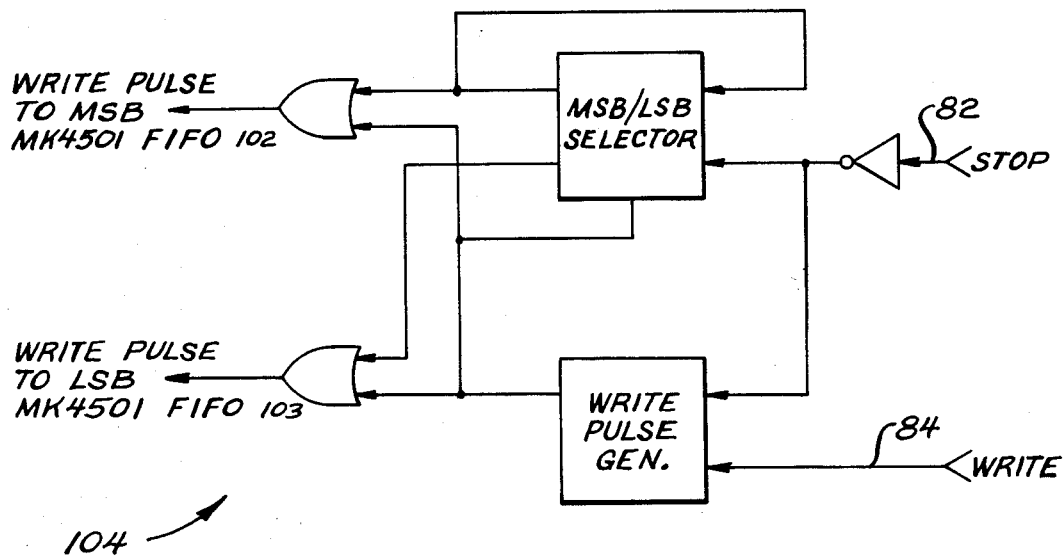

Bus interface control and buffer load logic 104 is responsible for strobing data from a TCC 40 into the correct FIFO buffer 100 or 102. This circuitry is illustrated in FIG. 6C and inserts all of the odd number bytes, i.e. bytes 1, 3, 5 and 7 received from a TCC 40 into FIFO 102 and all of the even number bytes, i.e. bytes 2, 4, 6 and 8 into FIFO 103.

Figure 7:
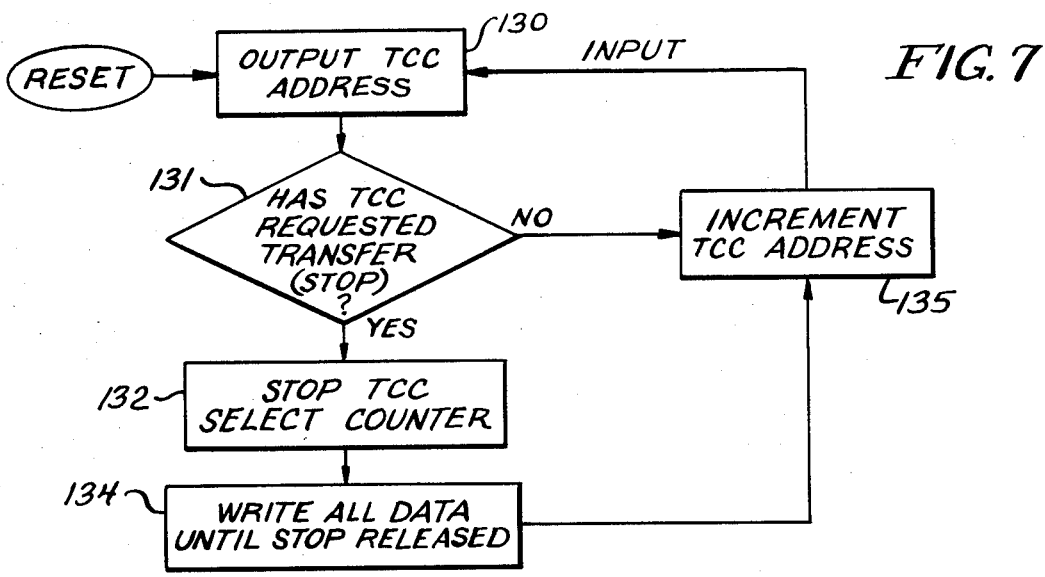
FIG. 7 describes the inputting of data to the multiplexer from the TCC.

A flow diagram for multiplexer 42 describing the input of the data from the TCCs is shown in FIG. 7. As counter 121 increments, its output is sent on a four line bus (A0, A1, A2, A3 of FIG. 6B), as indicated at block 130 of FIG. 7. Multiplexer 42 then determines whether STOP line 82 has been brought low, at decision diamond 131, for a requested data transfer. If so, counter 121 is stopped (block 132; see also the logic circuit 133 coupled to the Enable input of counter 121 in FIG. 6B). Data is then written into FIFOs 102, 103 (block 134 in FIG. 7), and counting is resumed (block 135).

Figure 8:
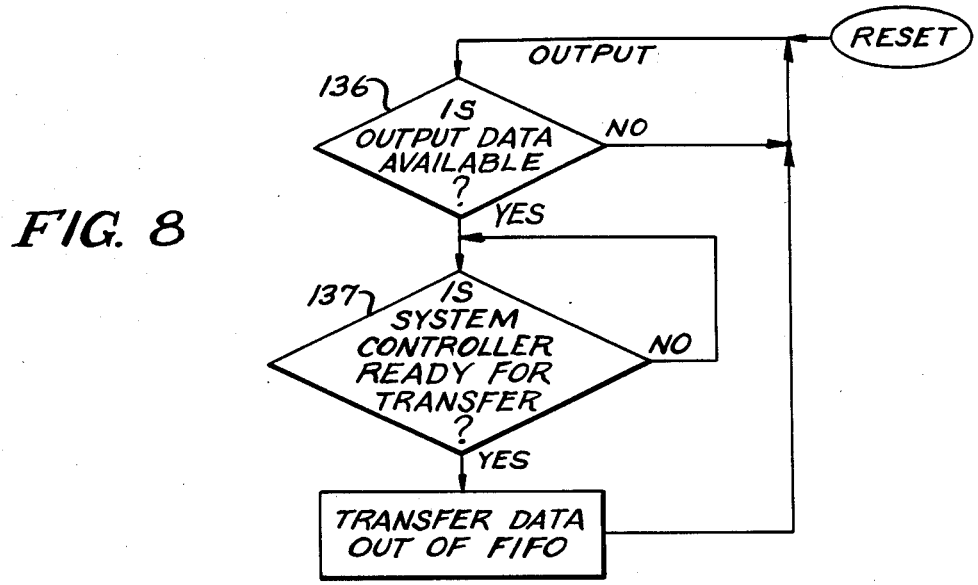
FIG. 8 describes the outputting of data from the multiplexer to the system controller.

The outputting of data from multiplexer 42 is shown in the flow diagram of FIG. 8. This includes determining whether multiplexer 42 has any temporarily stored data ready for outputting (diamond 136). Also a determination is made as to whether system controller 46 is ready for a transfer (diamond 137).

It should be noted that the inputting of data to multiplexer 42 is completely independent of the outputting of data from the multiplexer to system controller 46. This allows the telephone central office computers 24 and associated TCUs 20 to operate harmoniously with the system controller 46 at the headend station.

Referring again to FIG. 6, the input/output control logic 110 performs the handshaking between the multiplexer and the system controller. The handshaking process uses four control lines and corresponding signals: an end of message (EOM) signal on a line 139, a device command (DVCMD) on a line 140, a device flag (DVFLG) on a line 141, and a reset signal on a line 142. Data is transferred from multiplexer 42 to system controller 46 on bus 118 in response to the DVCMD signal, meaning that system controller 46 is ready to receive data, and a FIFO empty (FE) line 143 from FIFO 100 indicating that data is available for transfer, i.e., the FIFO is not empty. At that time, a read line 144 to the FIFO is activated as is the DVFLG line 141 to system controller 46. Once three complete words have been transferred to system controller 46, the EOM control line 139 goes high, signalling that the next word to be transferred will be the last word (Word #3).

System controller 46 preferably is an HP-1000 computer, which reads four words at a time. To ensure against loss of data, the reset signal on line 142 (from system controller 46) forces multiplexer 42 to perform dummy reads from FIFO buffers 102, 103 in order to ensure completion of a four packet transfer. The dummy reads are performed until the EOM signal on line 139 is detected at which time the reset circuitry 108 is disabled and normal read operations are resumed.

Multiplexer 42 converts the eight 8-bit bytes received from each TCC 40 into four 2-byte words which are sent to the system controller at a rate of up to 2M bytes/sec. The conversion process is accomplished by combining the data words stored in the odd byte FIFO 102 with the data words stored in the even byte FIFO 103 to produce a single 2 byte (sixteen bit) word. The sixteen bit words are sent to system controller 46 on the bus 118.

Figure 9:
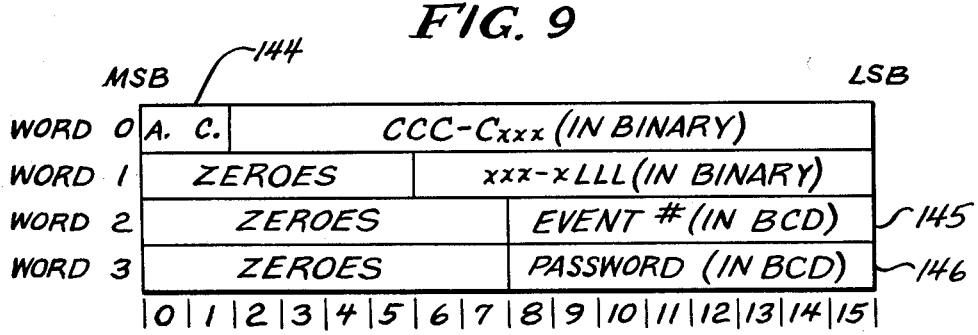
FIG. 9 shows the message format of the data sent from the multiplexer to the system controller.

FIG. 9 shows the format of the data words sent by multiplexer 42 to controller 46. The first two bits 144 of Word O represent the telephone area code of the cable subscriber originating the IPPV call. The area code was converted into the two bit format by a TCC 40. The number CCCC represents the first four digits (excluding the area code) of the cable subscriber's phone number, converted to binary by the TCC. The three Xs shown in Word O and the four Xs of Word 1 are used only to indicate the place of the numbers. The number LLL in Word 1 represents the last three digits of the cable subscriber's phone number, but in binary form. The event 145 and password 146 in Words 2 and 3, respectively, are the numbers entered by the cable subscriber to select a particular cable event. These numbers were converted to BCD (binary coded decimal) by the TCC 40 which processed the data.

By comparing the data format in FIG. 9 with Table IV, it can be seen that Word O sent from the multiplexer 42 to the system controller 46 is made up of bytes 1 and 2 sent to the multiplexer from TCC 40. Likewise, Word 1 is made from bytes 3 and 4, Word 2 is made from bytes 5 and 6, and Word 3 is made from bytes 7 and 8. The data sent to system controller 46 is sent in the format shown in FIG. 9 so that the system controller can process the information without extra manipulation. This speeds up the rate at which a cable subscriber's one-way addressable converter is authorized after the subscriber places an IPPV call.

System controller 46 processes the four sixteen bit words of FIG. 9 to identify the cable subscriber, find the subscriber's decoder address, and change the decoder authorization to allow viewing of the program selected by the subscriber (or to implement a cancellation at the subscriber's request). The system controller also initiates proper billing of the transaction by sending information to billing computer 50.

The four words sent to the system controller are sent directly to the buffer memory of the controller using direct memory access (DMA). In order to process the data sent to it at the fastest possible rate, system controller 46 employs a phase inverted synchronous input/output process using four buffers, two for input and two for output. FIG. 10 shows a diagram of this buffer system. While an input buffer 147 is receiving data from multiplexer 42, an output buffer 148 is outputting data to the cable TV encoder 48 or the billing computer 50. Concurrently, data from an input buffer 149 is being processed and sent to an output buffer 150. These concurrent processes are represented by the solid and broken lines in FIG. 10. When the data in input buffer 149 is exhausted, output buffer 150 receives data from other sources until it becomes filled. During this time, output buffer 148 continues to output data. When buffer 148 no longer has data to output, system controller 46 is interrupted, and the buffer arrangement is inverted. The inputting, outputting and processing after the interrupt is shown by the broken lines in FIG. 10. After the interrupt, data is inputted into input buffer 149; output buffer 150 sends data to cable TV encoder 48 or billing computer 50; and data from input buffer 147 is processed and sent to output buffer 148. This alternating process is continually repeated to ensure that processor 46 does not waste time waiting for data to be inputted or outputted.

As mentioned, system controller 46 processes the four words sent to it by multiplexer 42 to locate ("map") the address of the one-way addressable converter for the cable subscriber initiating the IPPV call, to check the password entered by the cable subscriber and to change the authorization code in the cable subscriber's converter in order to allow him to view the cable event. FIG. 11 is a diagram which should be helpful to understand the processing which occurs at system controller 46, addressable CATV encoder 48 and billing computer 50. Data from multiplexer 42 is applied to one of the input buffers of FIG. 10 which is represented as a buffer 151 in FIG. 11 receiving an input via line 152. The inputs comprise the four words depicted in FIG. 9. These four words are used to determine the action which is to occur. Words 0, 1 and 3 are used to map the telephone number of the subscriber into the address code of his converter, as shown at 154. Referring back to FIG. 9, it will be seen that Word 0 comprises the area code and part of the telephone number of the subscriber, and Word 1 completes the telephone number of the subscriber. At 154, system controller 46 finishes mapping the telephone number to the unique address code of the converter of the cable subscriber. Word 3 is used to make sure that the password is valid or, alternatively, to determine which of several converters are to be authorized at the premises of the cable subscriber. In this mapping function, system controller 46 refers to a data base 156, discussed infra. In the event that system controller 46 cannot map the telephone number into a converter code (because, for example, of a wrongfully dialed telephone number), an error is generated at 158. That error can also be generated if the data base reflects the unavailability of the event for purchase by that particular subscriber, because of bad credit, tardy bill payments, or whatever reasons are considered to be adequate by the cable company.

Word 2 of FIG. 9 identifies the cable event which the cable subscriber wishes to purchase or to cancel. Word 2 is applied at 160 to determine the action which is requested by the subscriber. The system provides for the subscriber to either request a pay per view cable event or, if he wishes, to cancel it within a prescribed time. Referring to a schedule 162, the determination is made as to whether the cable event is requested to be turned on or off. If no such cable event is found in the schedule 162, an error 164 will be generated. Assuming that there are no errors in the determinations 154 of 160, then an authorization to program the cable subscriber's converter as well as a program tag and a program identification are provided to an output 166. From there, the information is provided to an output buffer 168 which holds information until the CATV encoder 48 processes it.

In addition, from the output 166 information including the converter identification, the program identification, and a timestamp are posted to a disk at 170 within system controller 46. Subsequently, these postings are unloaded to billing computer 50, typically on the next business day. Billing computer 50 has editing capabilities via a line 172 with data base 156. Thus, if desired by the cable company, the billing computer can edit the data base so that no cable subscriber can exceed some limitation per month on cable pay per view events. Also, the system can provide in this manner for preventing any pay per view events from being purchased by a cable subscriber while permitting normal cable operation. This will be determined by the policy of the cable company, but the present system provides the flexibility to achieve all objectives of the cable company.

Figure 12:
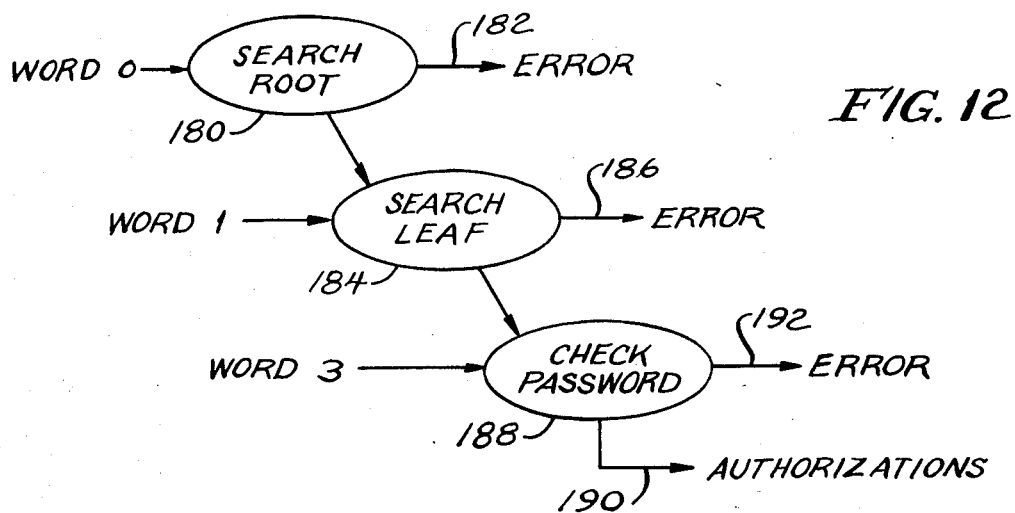
FIG. 12 is a sketch showing the two level searching used in the mapping algorithm applied in the system controller.

FIG. 12 further illustrates the mapping process occurring in system controller 46. To map the telephone number of the subscriber into an authorization code, system controller 46 preferably uses a two level tree having a root and many leaves. In the preferred system, a root corresponds to one page of memory (which is 1024 words, each 16 bits) and each leaf also is one page of memory. The root uses table searching. Thus, in FIG. 12, Word 0 is used to search the root at 180. The root usually has between 10 and 50 entries, which corresponds to the fact that the first four digits of a seven digit telephone number used by the telephone company occur in selected groups. In other words, there is a limitation used by the telephone company so that although four digits are used, there are fewer than 10,000 numbers which are actually assigned, although 10,000 are theoretically possible. This root is sometimes referred to as the PHIN root, standing for "phone index." In the event that the searching at 180 does not locate the number which has been specified by Word 0, then an error is indicated as shown at 182. However, if the leaf is found at 180, then Word 1 is used to search the leaf at 184. The leaf has many parts, and Word 1 is used to arrive at a correct pointer stored in the leaf. This method is referred to as direct indexing by persons skilled in the art, and is a time efficient method. The pointers will lead to the correct information for the converter of the cable subscriber who telephoned his request. In the event that the direct indexing does not locate the pointer, then an error is indicated at 186. If the pointer is found, then Word 3 is used to check the password at 188. If the password matches, then authorization can be provided at 190. If, however, the password does not match, then an error will issue at 192.

Figure 13:
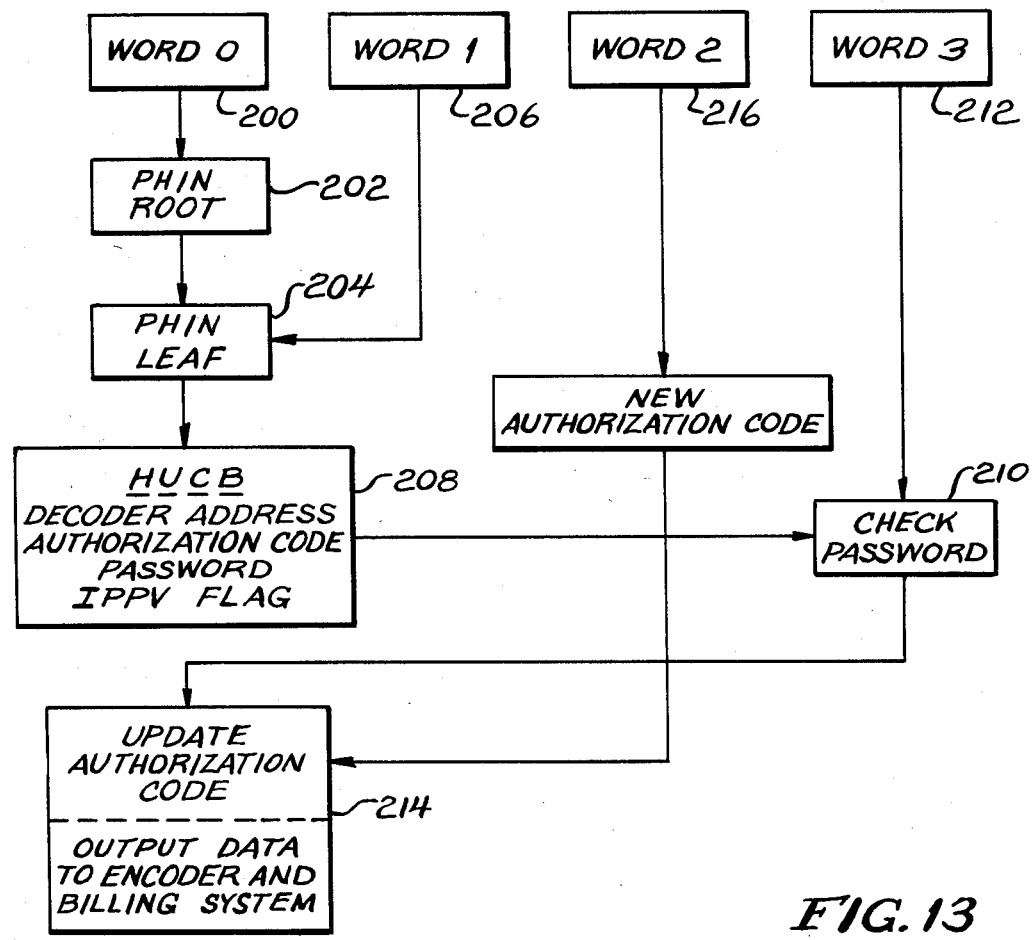
FIG. 13 illustrates further how the four words sent to the system controller are processed.

FIG. 13 illustrates the processing of the four words of FIG. 9 more particularly. Word 0 at block 200 containing the two bit area code and the fourteen bit number group corresponding to the first four digits of the cable subscriber's telephone number are used to locate within a phone index (PHIN) root 202 one of several leaves 204. Word 1 at block 206 containing the ten bits corresponding to the last three digits of the cable subscriber's telephone number is used to find the particular slot in the phone index leaf 204 containing a pointer to the unique data of interest. This points to a block 208 which contains the home unit control block (HUBC) comprising the cable subscriber's one-way addressable converter address, the current authorization code for the cable subscriber, a password and a IPPV flag. The password is then read from the home unit control block and compared at block 210 with the password contained part Word 3 which is represented by block 212. If the two passwords match, the home unit control block authorization bits are then updated at block 214 with the event number contained in Word 2 (in block 216). The new home unit control block information is then sent out to the cable subscriber's converter so that the converter will be enabled, thus allowing the viewer to view the program selected by the IPPV call. System controller 46 also downloads the necessary information to billing computer 50 so that the cable subscriber will be billed for the IPPV event.

Thus, it will be appreciated that at the cable headend station, data from multiple telephone offices are gathered, mapped into addresses and converter authorization codes (provided no errors are found), posted for billing purposes, and encoded for nearly instant updating. The mapping for each request preferably occurs in more than one step at plural locations, so the burden on the system controller is eased. As described herein, each TCC 40 converts ASCII characters for received phone numbers into binary data, and converts the ASCII characters identifying the PPV event to be purchased as well as the password into BCD. At the system controller, these data are mapped fully into converter addresses and program tags.

By the system of the present invention, there is provided a system for accepting impulse purchases from cable subscribers who do not have two-way cable TV systems. The described system is compatible with ANI passing, and accepts information provided by the telephone office ANI computer as fast as the computer can supply it. The data is automatically translated into a form usable by the system controller and communicated at a fast rate. Appropriate error checking occurs along the entire stream of data flow to ensure reliability. The requests of the cable subscribers are checked in real time, and barring any reason to forbear, the cable subscriber's cable TV addressable converter is authorized to allow th subscriber to view or cancel the cable event as desired. After the cable event is completed, the system controller clears the data base of the authorizations.

It will be apparent that numerous modifications can be made within the scope of the present invention. The arrangement described herein is illustrative, and the scope of protection is indicated by reference to the following claims.

APPENDIX I

ISIS-II 8080/8085 MACRO ASSEMBLER, V4.1     MODULE    PAGE   1

```
LOC  OBJ      LINE      SOURCE STATEMENT

1  ;;;;;;;;;;;;;;;;;;;;;;;;;;;;;;;;;;;;;;;;;;;;;;;;;;;;;;;;;;;;;;
               2  ;      COPYRIGHT 1985 ZENITH ELECTRONICS CORP.
               3  ; THIS PROGRAM WAS WRITTEN BY GORDON E. REICHARD ON 6/24/85.
               4  ; THIS PROGRAM IS CALLED TCU200, ALSO REFERRED TO AS Z-TCU200.
               5  ; THE PROGRAM PERFORMS THE FUNCTION OF RECEIVING SERIAL DATA FROM
               6  ; THE TELEPHONE COMPANY'S COMPUTER, STRIP AWAY UNWANTED DATA, AND
               7  ; TRANSMIT REMAINING DATA TO HEADEND.
               8  ;;;;;;;;;;;;;;;;;;;;;;;;;;;;;;;;;;;;;;;;;;;;;;;;;;;;;;;;;;;;;;
               9          ;
              10          ;
              11 ;;;;;;;;;;;;;;;;;;;;;;;;;;;;;;;;;;;;;;;;;;;;;;;;;;;;;;;;;;;;;;
              12 ; BEOW ARE THE EQUATE STATEMENTS USED TO ASSIGN LABELS TO
              13 ; HEXIDECIMAL VALUES.
              14 ;;;;;;;;;;;;;;;;;;;;;;;;;;;;;;;;;;;;;;;;;;;;;;;;;;;;;;;;;;;;;;
              15          ;
              16          ;
9000          17 ADATA   EQU    9000H         ;ASYNC DATA PORT, 8250
9000          18 BAUDLS  EQU    ADATA         ;LSB OF BAUD RATE
9001          19 BAUDMS  EQU    ADATA+1       ;MSB OF BAUD RATE
9003          20 LCR     EQU    ADATA+3       ;LINE CONTROL REG. 8250
9001          21 DISINR  EQU    ADATA+1       ;DISABLE INTERRUPT REG. 8250
9005          22 ASTAT   EQU    ADATA+5       ;ASYNC STATUS PORT, 8250
4000          23 RAM     EQU    4000H
4000          24 BUFFER  EQU    RAM           ;IN AND OUT BUFFER
6000          25 SCMDRG  EQU    6000H         ;SYNC COMMAND REG. 8273
6000          26 SSTAT   EQU    SCMDRG        ;SYNC STATUS REG. 8273
6001          27 SPRMRG  EQU    SCMDRG+1      ;SYNC PARAMETER REG.
6001          28 RESULT  EQU    SPRMRG        ;RESULT REGISTER
6002          29 TXIR    EQU    SCMDRG+2      ;TRANSMIT INTERRUPT REG.
6003          30 RXIR    EQU    SCMDRG+3      ;RECEIVER INTERRUPT REG.
4FA0          31 POINTO  EQU    4FA0H         ;OUTPUT POINTER
4FA2          32 POINTI  EQU    POINTO+2      ;INPUT POINTER
7000          33 SDATAO  EQU    7000H         ;SYNC DATA OUTPUT, 8273
8000          34 SDATAI  EQU    08000H        ;SYNC DATA INPUT, 8273
4FA4          35 INCOME  EQU    POINTI+2      ;INCOMING DATA PACKET PENDING
FF0C          36 COUNTS  EQU    0FF0CH        ;B AND C COUNTERS
4FA5          37 TXSTAT  EQU    POINTI+3      ;CURRENT 8273 X-MIT STATUS
4FA6          38 ACKFLG  EQU    POINTI+4      ;ACKNOWLEDGEMENT FLAG
4FA7          39 XMIT    EQU    POINTI+5      ;START ADDRESS OF X-MIT SET-UP
4FAC          40 CNTRL   EQU    XMIT+5        ;CONTROL FIELD FOR SDLC FRAME
4FAC          41 ID      EQU    CNTRL         ;PACKET ID NUMBER RAM LOCATION
4FAD          42 PACKET  EQU    POINTI2+11    ;PACKETS REMAINING IN RAM
4FB0          43 ACKBYT  EQU    4FB0H         ;MEM. LOCATION OF TIME-OUT COUNTER
4FB1          44 CRTBUF  EQU    4FB1H         ;DATA HERE IS OUTPUT TO CRT
4FB2          45 STATUS  EQU    4FB2H         ;STATUS BYTE READ FROM 8273
4FB3          46 CURRENT EQU    4FB3H         ;CURRENT OUTPUT POINTER (ALSO 4FB4H)
4FB5          47 PTINP   EQU    4FB5H         ;RIGID INPUT POINTER, INCREMENTS OF 13H
4FB7          48 TIME    EQU    4FB7H         ;TIME OUT COUNTER
E000          49 RESET   EQU    0E000H        ;WATCH DOG RESET CIRCUIT ADDRESS
```

```
                        50      ;
                        51      ;
                        52 ;;;;;;;;;;;;;;;;;;;;;;;;;;;;;;;;;;;;;;;;;;;;;;;;;;;;;;;;;;;
                        53 ; THIS BEGINS THE INITIALIZATION OF REGISTERS AND CHIPS.
                        54 ;;;;;;;;;;;;;;;;;;;;;;;;;;;;;;;;;;;;;;;;;;;;;;;;;;;;;;;;;;;
                        55      ;
                        56      ;
0000                    57      ORG     0000H
0000 F3                 58      DI
0001 3E19               59      MVI     A,19H           ;ENABLE INTERRUPTS, 7.5 AND 6.5
0003 30                 60      SIM                     ;SET INTERRUPT MASK
0004 210040             61      LXI     H,RAM           ;SET ALL POINTERS TO TOP OF RAM
0007 22B34F             62      SHLD    CURRENT
000A 22A24F             63      SHLD    POINTI
000D 22A04F             64      SHLD    POINTO
0010 22B54F             65      SHLD    PTINF
0013 C34000             66      JMP     BEGIN
                        67      ;
002C                    68      ORG     002CH           ;RST 5.5
002C C30502             69      JMP     GETACK
                        70      ;
0034                    71      ORG     0034H           ;RST 6.5
0034 C38E01             72      JMP     OUTDAT
                        73      ;
003C                    74      ORG     003CH           ;RST 7.5
003C C31F01             75      JMP     DATAIN
                        76      ;
0040                    77      ORG     0040H           ;BEGINNING OF MAIN PROGRAM
0040 310050             78 BEGIN: LXI    SP,5000H        ;SET STACK POINTER TO TOP
0043 CDD402             79      CALL    I8250I          ;INITIALIZE 8250, IC1
0046 CD1703             80      CALL    I8250Z
0049 CDF802             81      CALL    I8273
004C CD6E03             82      CALL    IXMIT           ;SET-UP OUTPUT ARRAY
004F 3E0C               83      MVI     A,0CH           ;HEADER COUNT
0051 32A44F             84      STA     INCOME          ;STORE HEADER COUNT
0054 3E00               85      MVI     A,00H
0056 32AD4F             86      STA     PACKET          ;ZERO PACKET COUNT
0059 32AC4F             87      STA     ID              ;RESET ID NUMBER
                        88      ;
                        89      ;
                        90 ;;;;;;;;;;;;;;;;;;;;;;;;;;;;;;;;;;;;;;;;;;;;;;;;;;;;;;;;;;;
                        91 ; THIS MARKS THE BEGINNING OF THE MAIN BODY OF THE PROGRAM.
                        92 ;;;;;;;;;;;;;;;;;;;;;;;;;;;;;;;;;;;;;;;;;;;;;;;;;;;;;;;;;;;
                        93      ;
                        94      ;
005C 3EFF               95 MAIN:  MVI    A,0FFH          ;SET FLAG, NO ACKNOLEDGES EXPECTED
005E 32A64F             96      STA     ACKFLG
0061 2AA24F             97      LHLD    POINTI          ;LOAD HL WITH INPUT POINTER
0064 CDCA00             98      CALL    HEDONE          ;GET INPUT DATA PACKET ONLY
0067 CD7901             99      CALL    UPI3            ;INCREMENT INPUT POINTERS TO NEXT INPUT BLOCK
006A 3E0C               100     MVI     A,0CH           ;SET-UP INCOME COUNTER FOR NEXT DATA INPUT
006C 32A44F             101     STA     INCOME
006F 3E01               102     MVI     A,01H           ;SINCE ONE PACKET HAS BEEN RECEIVED
0071 32AD4F             103     STA     PACKET          ;SET PACKET COUNT EQUAL TO 1
0074 F3                 104 TXSTRT: DI                  ;DISABLE INTERRUPTS
0075 3E09               105     MVI     A,09H           ;ENABLE 7.5 AND 6.5
0077 30                 106     SIM
0078 21A74F             107     LXI     H,XMIT          ;PREPARE TO TURN-ON TRANSMITTER
007B CD3903             108     CALL    CMDOUT          ;OUTPUT COMMANDS
007E FB                 109 MLOOP: EI
007F 3200E0             110     STA     RESET           ;HIT RESET CIRCUIT
0082 00                 111     NOP
0083 C37E00             112     JMP     MLOOP           ;IF NOT, KEEP LOOPING
```

```
0086 21FFFF    113 ACKLOP: LXI    H,0FFFFH     ;SET-UP TIME-OUT COUNTER FOR 24MS
0089 22B74F    114         SHLD   TIME
008C 2AB74F    115 ACKLP2: LHLD   TIME         ;GET CURRENT TIME-OUT COUNT
008F 2B        116         DCX    H            ;DECREMENT THAT VLAUE
0090 22B74F    117         SHLD   TIME         ;STORE NEW VALUE
0093 7C        118         MOV    A,H
0094 A7        119         ANA    A            ;SEE IF COUNT IS EQUAL TO ZERO
0095 CAA200    120         JZ     NOACK        ;IF COUNT IS ZERO, NO ACK.
0098 FB        121         EI
0099 3200E0    122         STA    RESET
009C 00        123         NOP
009D 00        124         NOP
009E F3        125         DI
009F C38C00    126         JMP    ACKLP2
00A2 F3        127 NOACK:  DI
00A3 2AA04F    128         LHLD   POINTO       ;TREAT NO ACK. AS A NACK
00A6 22B34F    129         SHLD   CURRENT      ;RESET POINTER TO RETRANSMIT
00A9 216803    130         LXI    H,DR         ;PREPARE TO DISABLE RECEIVER
00AC CD3903    131         CALL   CMDOUT
00AF 3E09      132         MVI    A,09H        ;ENABLE 7.5 AND 6.5
00B1 30        133         SIM
00B2 FB        134         EI                  ;ENABLE INTERRUPTS
00B3 00        135         NOP
00B4 3200E0    136         STA    RESET        ;WAST TIME TO SEE IF DATA IS AVAILABLE
00B7 C37400    137         JMP    TXSTRT       ;BEGIN RETRANSMISSION
               138         ;
00BA F3        139 INLOOP: DI
00BB 3AAD4F    140         LDA    PACKET       ;GET PACKET COUNT
00BE A7        141         ANA    A            ;IS THERE A COMPLETE PACKET IN RAM
00BF C27400    142         JNZ    TXSTRT       ;IF SO, BEGIN TRANSMISSION
00C2 FB        143         EI                  ;ELSE WAIT FOR COMPLETE PACKET
00C3 3200E0    144         STA    RESET        ;HIT RESET CIRCUITRY
00C6 00        145         NOP
00C7 C3BA00    146         JMP    INLOOP
               147         ;
               148 ;;;;;;;;;;;;;;;;;;;;;;;;;;;;;;;;;;;;;;;;;;;;;;
               149 ;
               150 ;LOOK FOR DATA WITHOUT HAVING ANY DATA TO OUTPUT.
               151 ;
               152 ;;;;;;;;;;;;;;;;;;;;;;;;;;;;;;;;;;;;;;;;;;;;;;
00CA 3A0590    153 HLOOK:  LDA    ASTAT        ;GET STATUS
00CD E601      154         ANI    01H          ;IS DATA AVAILABLE
00CF 3200E0    155         STA    RESET        ;HIT RESET CIRCUITRY
00D2 CACA00    156         JZ     HLOOK        ;IF NOT, WAIT
00D5 3A0090    157         LDA    ADATA        ;ELSE, READ DATA BYTE
00D8 FE42      158         CPI    42H          ;IS IT AN ASCII B
00DA C2CA00    159         JNZ    HLOOK        ;IF NOT, WAIT FOR NEXT BYTE
00DD 3E09      160         MVI    A,09H        ;ELSE, ADJUST INCOME COUNTER
00DF 32A44F    161         STA    INCOME
00E2 3AA44F    162 HLOOK2: LDA    INCOME       ;GET HEADER COUNTER
00E5 A7        163         ANA    A            ;SEE IF HEADER DONE
00E6 CAF900    164         JZ     DLOOK        ;IF NOT, GET DATA
00E9 47        165         MOV    B,A          ;ELSE, PUT COUNT INTO REG. B
00EA 3A0590    166 AGAIN:  LDA    ASTAT        ;GET STATUS FROM 8250
00ED E601      167         ANI    01H          ;MASK TO GET DR FLAG
00EF 3200E0    168         STA    RESET        ;HIT RESET CIRCUITRY
00F2 CAEA00    169         JZ     AGAIN        ;IF NO DATA READY, LOOK AGAIN
               170         ;
00F5 3A0090    171         LDA    ADATA        ;READ CHARACTER TO RESET DR
00F8 05        172         DCR    B            ;DECREMENT HEADER COUNTER
00F9 C2EA00    173         JNZ    AGAIN
               174         ;
               175 ;;;;;;;;;;;;;;;;;;;;;;;;;;;;;;;;;;;;;;;;;;;;;;
```

```
          176 ;
          177 ;LOOK FOR DATA. HEADER ALREADY REMOVED.
          178 ;
          179 ;;;;;;;;;;;;;;;;;;;;;;;;;;;;;;;;;;;;;;;;;;;;;;;;;;
00FC 3A0590  180 DLOOK: LDA    ASTAT      ;GET 8250 STATUS
00FF E601    181        ANI    01H        ;
0101 3200E0  182        STA    RESET      ;HIT RESET CIRCUITRY
0104 CAFC00  183        JZ     DLOOK      ;IF NO DATA AVAILABLE, WAIT
0107 3A0090  184 INP:   LDA    ADATA      ;GET DATA BYTE
010A FE20    185        CPI    20H        ;IS IT A SPACE
010C CAFC00  186        JZ     DLOOK      ;IF SO, GET NEXT BYTE
010F 320080  187        STA    8000H      ;OUTPUT TO CRT
0112 FE0D    188        CPI    0DH        ;IS IT A CR
0114 CAFC00  189        JZ     DLOOK      ;IF SO, GET NEXT BYTE
0117 FE0A    190        CPI    0AH        ;IS DATA A LF
0119 C8      191        RZ                ;IF SO, PACKET COMPLETE
011A 77      192        MOV    M,A        ;IF NOT, STORE DATA IN RAM
011B 23      193        INX    H          ;INCREMENT INPUT POINTER
011C C3FC00  194        JMP    DLOOK      ;GET NEXT DATA BYTE
          195 ;;;;;;;;;;;;;;;;;;;;;;;;;;;;;;;;;;;;;;;;;;;;;;;;;;
          196 ; THIS ROUTINE INPUTS DATA, ELIMINATES THE PACKET HEADER AND
          197 ; STORES THE DATA IN RAM. INPUT FROM 8250.
          198 ;;;;;;;;;;;;;;;;;;;;;;;;;;;;;;;;;;;;;;;;;;;;;;;;;;
          199        ;
          200        ;
011F F5      201 DATAIN: PUSH  PSW        ;SAVE CPU STATUS WORD
0120 3E10    202        MVI    A,10H      ;RESET RST 7.5
0122 30      203        SIM
0123 2AA24F  204        LHLD   POINTI     ;GET CURRENT INPUT POINTER
0126 3A0590  205        LDA    ASTAT      ;GET STATUS FROM 8250
0129 E601    206        ANI    01H        ;IS THERE INPUT DATA PENDING
012B CA7701  207        JZ     RETFLG     ;IF NOT, RETURN
012E 3AA44F  208 INPUTD: LDA   INCOME     ;ELSE DATA IS PRESENT, SEE IF HEADER
             209                          ;IS STILL PRESENT
0131 A7      210        ANA    A          ;IS IT ZERO
0132 CA3E01  211        JZ     DIN        ;IS SO, VALID DATA IS PRESENT, GET IT
0135 3D      212        DCR    A          ;ELSE, DECREMENT COUNT
0136 32A44F  213        STA    INCOME     ;STORE HEADER COUNT
0139 3A0090  214        LDA    ADATA      ;DO A DUMMY READ TO CLEAR INTERRUPT
013C F1      215        POP    PSW        ;RESTORE CPU STATUS WORD
013D C9      216        RET
013E 3A0090  217 DIN:   LDA    ADATA      ;GET DATA BYTE
0141 FE20    218        CPI    20H        ;IS IT A SPACE
0143 CA7701  219        JZ     RETFLG
0146 320080  220        STA    8000H      ;OUTPUT TO CRT
0149 FE0D    221        CPI    0DH        ;IS IT A CR
014B CA7701  222        JZ     RETFLG
014E FE0A    223        CPI    0AH        ;IS IT A LF
0150 CA5A01  224        JZ     INDONE     ;IF SO, INPUT PACKET COMPLETE
0153 77      225        MOV    M,A        ;ELSE, VALID DATA, STORE IN RAM
0154 23      226        INX    H
0155 22A24F  227        SHLD   POINTI     ;STORE UPDATED INPUT POINTER
0158 F1      228        POP    PSW        ;RESTORE FLAGS
0159 C9      229        RET
015A 3E0C    230 INDONE: MVI   A,0CH      ;RESET HEADER COUNT
015C 32A44F  231        STA    INCOME
015F 3AAD4F  232        LDA    PACKET     ;GET CURRENT PACKET COUNT
0162 FED0    233        CPI    0D0H       ;HAS MAX. PACKET COUNT BEEN REACHED
0164 CA7101  234        JZ     RETRES     ;IF SO, RESET INPUT POINTERS AND RETURN
0167 3C      235        INR    A          ;ELSE, INCREMENT PACKET COUNT
0168 32AD4F  236        STA    PACKET     ;STORE NEW VALUE
016B CD7901  237        CALL   UPIN       ;INCREMENT INPUT POINTERS TO NEXT BLOCK
016E C37701  238        JMP    RETFLG     ;RETURN TO MAIN BODY
```

```
0171 2AB54F      239 RETRES: LHLD   PTINF       ;GET CURRENT INPUT BASE POINTER
0174 22A24F      240         SHLD   POINTI      ;RESET INPUT POINTER TO OVERWRITE
0177 F1          241 RETFLE: POP    PSW         ;RESTORE CPU STATUS WORD BEFORE RETURNING
0178 C9          242         RET
                 243         ;
                 244         ;
                 245 ;;;;;;;;;;;;;;;;;;;;;;;;;;;;;;;;;;;;;;;;;;;;;;;;;;;;;;;;;;;;;;
                 246 ; THIS ROUTINE INCREMENTS THE INPUT POINTERS IN INCREMENTS OF 13H. THIS
                 247 ; ROUTINE ALSO INSURES THE POINTERS ARE IN BUFFER RANGE.
                 248 ;;;;;;;;;;;;;;;;;;;;;;;;;;;;;;;;;;;;;;;;;;;;;;;;;;;;;;;;;;;;;;
                 249         ;
                 250         ;
0179 3E13        251 UP13:   MVI    A,13H       ;VALUE TO BE INCREMENTED
017B 2AB54F      252         LHLD   PTINF       ;GET LAST BASE INPUT POINTER
017E 85          253         ADD    L           ;INCREMENT TO NEXT INPUT BASE
017F 6F          254         MOV    L,A         ;PUT INCREMENTED VALUE BACK INTO L
0180 3E00        255         MVI    A,00H       ;CLEAR A
0182 8C          256         ADC    H           ;ADD CARRY TO REGISTER H
0183 67          257         MOV    H,A         ;RESTORE UPDATE VALUE
0184 CDF901      258         CALL   OVERFL      ;INSURE POINTERS ARE STILL IN RANGE
0187 22B54F      259         SHLD   PTINF       ;STORE NEW INPUT POINTERS
018A 22A24F      260         SHLD   POINTI
018D C9          261         RET
                 262         ;
                 263         ;
                 264 ;;;;;;;;;;;;;;;;;;;;;;;;;;;;;;;;;;;;;;;;;;;;;;;;;;;;;;;;;;;;;;
                 265 ; THIS ROUTINE OUTPUTS A SINGLE DATA BYTE TO THE 8273 UPON
                 266 ; REQUEST, THIS ROUTINE ALSO CHECKS FOR TRANSMISSION ERRORS AND
                 267 ; END-OF-MESSAGE INTERRUPTS.
                 268 ;;;;;;;;;;;;;;;;;;;;;;;;;;;;;;;;;;;;;;;;;;;;;;;;;;;;;;;;;;;;;;
                 269         ;
                 270         ;
                 271         ;
018E 3A0060      272 OUTDAT: LDA    SSTAT       ;GET STATUS FROM 8273
0191 32B24F      273         STA    STATUS      ;STORE CURRENT STATUS
0194 E601        274         ANI    01H         ;IS THERE AN INTERRUPT RESULT AVAIL.
0196 CAED01      275         JZ     OUTBYT      ;IF NOT, OUTPUT DATA BYTE
0199 3AB24F      276         LDA    STATUS      ;GET PREVIOUSLY READ STATUS BYTE
019C E610        277         ANI    10H         ;IS THERE AN IMMEDIATE RESULT AVAIL.
019E CAA501      278         JZ     CONT        ;IF NOT CONTINUE ON
01A1 3A0160      279         LDA    6001H       ;IF SO, READ RESULT
01A4 C9          280         RET
01A5 3A0260      281 CONT:   LDA    TXIR        ;READ INTERRUPT RESULT BYTE
01A8 FE0D        282         CPI    0DH         ;IS PACKET COMPLETE AND ERROR FREE
01AA C2B601      283         JNZ    BAD         ;IF NOT, GOTO TO BAD
01AD 3E00        284         MVI    A,00H       ;RESET NO ACK. FLAG
01AF 32A64F      285         STA    ACKFLG
01B2 C3C201      286         JMP    STATLP      ;CHECK AGAIN
01B5 00          287         NOP                ;TURN RECEIVER ON AT THIS POINT
01B6 3EFF        288 BAD:    MVI    A,0FFH      ;SET NO ACK FLAG
01B8 32A64F      289         STA    ACKFLG
01BB 2AA04F      290         LHLD   POINTO      ;LOAD ORIGINAL OUTPUT POINTER
01BE 22B34F      291         SHLD   CURRENT     ;STORE IN CURRENT OUTPUT POINTER LOC.
01C1 00          292         NOP                ;SINCE PACKET IS BAD, PREPARE TO RETRANS.
01C2 3A0060      293 STATLP: LDA    SSTAT       ;GET STATUS BYTE TO CHECK FOR RESULTS
01C5 E601        294         ANI    01H         ;ARE THERE ANY MORE RESULTS AVAILABLE
01C7 CAD001      295         JZ     TURNON      ;IF NO RESULTS, RETURN (RZ)
01CA 3A0260      296         LDA    TXIR        ;READ INTERRUPT RESULT BYTE
01CD C3C201      297         JMP    STATLP      ;CHECK FOR MORE RESULT BYTES
01D0 3AA64F      298 TURNON: LDA    ACKFLG      ;GET ACK FLAG
01D3 A7          299         ANA    A           ;IS AN ACK EXPECTED
01D4 CADC01      300         JZ     RXON        ;IF SO, PREPARE TO TURN ON RECEIVER
01D7 217400      301 TXON:   LXI    H,TXSTRT    ;LOAD HL WITH RETURN ADDRESS
```

```
01DA E3         302           XTHL                        ;PUT ON TOP OF STACK
01DB C9         303           RET
01DC 218600     304 RXON:     LXI      H,ACKLOP          ;PUT ACKLOP PROGRAM LOCATION INTO HL
01DF E3         305           XTHL                        ;REPLACE WITH TOP OF STACK
01E0 3E0A       306           MVI      A,0AH             ;SET INTR. MASK TO RECEIVE
01E2 30         307           SIM
01E3 216A03     308           LXI      H,RCV             ;TURN-ON RECEIVER
01E6 CD3903     309           CALL     CMDOUT            ;OUTPUT TURN-ON COMMANDS
01E9 01B90A     310           LXI      B,0AB9H           ;SET-UP TIME-OUT COUNTER, 24MS WAIT
01EC C9         311           RET
01ED 2AB34F     312 OUTBYT:   LHLD     CURRENT           ;GET CURRENT OUTPUT DATA POINTER
01F0 7E         313           MOV      A,M               ;PUT DATA BYTE INTO A
01F1 320070     314           STA      SDATAO            ;OUTPUT DATA TO 8273
01F4 23         315           INX      H
01F5 22B34F     316           SHLD     CURRENT           ;STORE UPDATED OUPUT POINTER
01F8 C9         317           RET
                318           ;
                319 ;;;;;;;;;;;;;;;;;;;;;;;;;;;;;;;;;;;;;;;;;;;;;;;;;;;;;;;
                320 ; THIS ROUTINE CHECKS THE POINTER VALUE IN THE H&L REGISTER
                321 ; PAIR TO INSURE THAT IT IS NOT OUT-OF-RANGE
                322 ;;;;;;;;;;;;;;;;;;;;;;;;;;;;;;;;;;;;;;;;;;;;;;;;;;;;;;;
                323           ;
                324           ;
01F9 7D         325 OVERFL:   MOV      A,L               ;MOVE LSB OF POINTER INTO A
01FA FE70       326           CPI      70H
01FC C0         327           RNZ
01FD 7C         328           MOV      A,H               ;MOVE MSB OF POINTER INTO A
01FE FE4F       329           CPI      4FH
0200 C0         330           RNZ
0201 210040     331           LXI      H,RAM             ;IF POINTER IS 4F70H, RESET TO TOP
                332                                      ;OF RAM
0204 C9         333           RET
                334           ;
                335           ;
                336 ;;;;;;;;;;;;;;;;;;;;;;;;;;;;;;;;;;;;;;;;;;;;;;;;;;;;;;;
                337 ; THIS ROUTINE INPUTS A DATA BYTE FROM THE 8273, THIS ROUTINE
                338 ; ALSO CHECKS FOR TRANSMISSIONS ERRORS AS WELL AND THE END-
                339 ; OF-MESSAGE FLAG.
                340 ;;;;;;;;;;;;;;;;;;;;;;;;;;;;;;;;;;;;;;;;;;;;;;;;;;;;;;;
                341           ;
                342           ;
0205 3E0A       343 GETACK:   MVI      A,0AH             ;SET INTERRUPT MASK TO OUTPUT
0207 30         344           SIM                        ;TO CRT.
0208 3A0050     345           LDA      SSTAT             ;GET STATUS WORD FROM 8273
020B 32B24F     346           STA      STATUS            ;STORE STATUS WORD
020E E602       347           ANI      02H               ;IS THERE A RECEIVER INTERRUPT RESULT
0210 CAB102     348           JZ       INBYTE            ;IF NOT, INPUT DATA IS AVAILABLE
0213 3AB24F     349           LDA      STATUS            ;ELSE, READ STATUS BYTE & DETERMINE RESULT
0216 E610       350           ANI      10H               ;IS IT AN IMMEDIATE RESULT
0218 CA2202     351           JZ       CONTR             ;IF NOT CONTINUE
021B 3A0160     352           LDA      RESULT            ;ELSE, READ RESULT
021E 01B90A     353           LXI      B,0AB9H           ;RESTORE TIME-OUT COUNTER
0221 C9         354           RET
0222 3A0060     355 CONTR:    LDA      RXIR              ;READ RECEIVER INTERRUPT RESULT
0225 FE03       356           CPI      03H               ;SEE IF CRC ERROR HAS OCCURRED
0227 CAB402     357           JZ       DATCRC            ;IF SO, DETERMINE TYPE
022A E60F       358           ANI      0FH               ;IS PACKET RECEIVED COMPLETE AND ERROR FREE
022C C24E02     359           JNZ      BADR              ;IF NOT, GOTO BAD RECEIVE
022F 0E04       360 GOODR:    MVI      C,04H             ;SET-UP COUNTER TO GET PACKET ID
0231 20         361 RL1:      RIM                        ;CHECK INTERRUPTS
0232 E640       362           ANI      40H               ;SEE IF INPUT DATA IS AVAILABLE
0234 C25C02     363           JNZ      RXCALL            ;IF SO, PREPARE TO GET DATA BYTE
0237 3A0060     364 RL2:      LDA      SSTAT             ;GET SYNC. STATUS WORD
```

```
02CA E602      365         ANI     02H         ;IS A RESULT AVAILABLE
023C CA3102    366         JZ      RL1         ;IF NOT, WAIT
023F 3A0360    367         LDA     RXIR        ;GET RESULT
0242 0D        368         DCR     C           ;DECREMENT COUNTER
0243 C23102    369         JNZ     RL1         ;IF NOT ID BYTE, GET NEXT RESULT
0246 47        370         MOV     B,A         ;ELSE IT IS ID, PUT INTO B
0247 3AAC4F    371         LDA     ID          ;GET TRANSMITTED ID
024A B8        372         CMP     B           ;ARE THEY THE SAME
024B CA7302    373         JZ      GOODTX      ;IF SO, THE TRANSMISSION WAS RECEIVED
024E 2AA04F    374 BADR:   LHLD    POINTO      ;ELSE, IT WAS NOT PROPERLY RECEIVED
0251 22B34F    375         SHLD    CURRENT     ;RESET POINTERS TO RETRANSMIT
0254 3EFF      376         MVI     A,0FFH      ;SET NO ACK. FLAG
0256 32A64F    377         STA     ACKFLG
0259 C39802    378         JMP     RSTAT
               379         ;
025C C5        380 RXCALL: PUSH    B           ;PUT RECEIVE PACKET ID COUNTER ON STACK
025D CD1F01    381         CALL    DATAIN      ;GET DATA BYTE
0260 C1        382         POP     B           ;PULL PACKET ID COUNT OFF OF STACK
0261 C33702    383         JMP     RL2         ;CONTINUE CHECKING STATUS OF 8273
               384         ;
0264 3AA64F    385 DATCRC: LDA     ACKFLG      ;GET ACKFLG TO SEE IF DATA HAS BEEN RECEIVED
0267 FEAA      386         CPI     0AAH        ;IF ACKFLG=0AAH, DATA HAS BEEN RECEIVED
0269 CA4E02    387         JZ      BADR        ;IF SO, THEN PACKET IS IN ERROR
026C 3E00      388         MVI     A,00H       ;ELSE, FLASE CRC ERROR WAS DETECTED
026E 30        389         SIM
026F 01B90A    390         LXI     B,0AB9H     ;RESET TIME-OUT COUNTER
0272 C9        391         RET                 ;CONTINUE LOOKING FOR ACK.
0273 3AB04F    392 GOODTX: LDA     ACKBYT      ;GET ACK. BYTE
0276 FEA5      393         CPI     0A5H        ;WAS IT A POSITIVE ACKNOWLEDGEMNET
0278 C24E02    394         JNZ     BADR        ;IF NOT, SET-UP FOR RETRANSMISSION
027B 2AB34F    395         LHLD    CURRENT     ;GET CURRENT OUTPUT POINTER
027E CDF901    396         CALL    OVERFL      ;INSURE POINTER IS WITHIN RANGE
0281 22B34F    397         SHLD    CURRENT
0284 22A04F    398         SHLD    POINTO      ;STORE UPDATED POINTERS
0287 3AAC4F    399         LDA     ID          ;GET CURRENT PACKET ID NUMBER
028A 3C        400         INR     A           ;INCREMENT ID NUMBER FOR NEXT TRANSMISSION
028B 32AC4F    401         STA     ID          ;STORE NEW ID NUMBER
028E 3AAD4F    402         LDA     PACKET      ;GET CURRENT PACKET COUNT
0291 3D        403         DCR     A           ;DECREMENT THAT VALUE
0292 32AD4F    404         STA     PACKET      ;STORE NEW VALUE
0295 CAC402    405         JZ      EMPTY       ;IF PACKET COUNT=0, BUFFER IS EMPTY
               406         ;
0298 216B03    407 RSTAT:  LXI     H,DR        ;TURN-OFF RECEIVER
029B CD3503    408         CALL    CMDOUT
029E 3E09      409         MVI     A,09H       ;SET INTERRUPT MASK FOR TRANSMISSION
02A0 30        410         SIM
02A1 217400    411         LXI     H,TXSTRT    ;LOAD HL WITH RECEIVER TURN-ON COMMAND LINE
02A4 E3        412         XTHL                ;REPLACE THAT ADDRESS WITH STACK
02A5 3A0060    413 RSTATL: LDA     SSTAT       ;READ STATUS
02A8 E602      414         ANI     02H         ;ANY RXIR AVAILABLE
02AA C8        415         RZ                  ;IF NO RESLUTS, RETURN
02AB 3A0360    416         LDA     RXIR        ;ELSE, READ INTERRUPT RESULT
02AE C3A502    417         JMP     RSTATL      ;CHECK TO SEE IF ANY MORE RESULTS EXIST
               418         ;
02B1 2AB34F    419 INBYTE: LHLD    CURRENT     ;GET CURRENT INPUT POINTER
02B4 3A0080    420         LDA     SDATAI      ;GET INPUT DATA BYTE
02B7 32B04F    421         STA     ACKBYT      ;STORE ACKNOWLEDGEMENT BYTE
02BA 01B90A    422         LXI     B,0AB9H     ;RESTORE TIME-OUT COUNTER, 24MS
02BD 3EAA      423         MVI     A,0AAH      ;PUT 0AAH IN ACKFLG TO SHOW DATA RECEIVED
02BF 32A64F    424         STA     ACKFLG
02C2 A7        425         ANA     A           ;RESET ZERO FLAG IN CPU STATUS WORD
02C3 C9        426         RET
               427         ;
```

```
02C4 216803    428 EMPTY:  LXI    H,DR          ;DISABLE RECEIVER
02C7 CD3903    429         CALL   CMDOUT
02CA 3E0B      430         MVI    A,0BH         ;SET INTERRUPT MASK, ENABLE 7.5
02CC 30        431         SIM
02CD 216A03    432         LXI    H,INLOOP      ;SINCE RAM IS EMPTY, GET A COMPLETE PACKET
02D0 E3        433         XTHL
02D1 C3A503    434         JMP    RSTATL
               435  ;
               436  ;
               437  ;;;;;;;;;;;;;;;;;;;;;;;;;;;;;;;;;;;;;;;;;;;;;;;;;;;;;;;
               438  ; THE ROUTINES BELOW INITIALIZE THE SERIAL CHIPS
               439  ;;;;;;;;;;;;;;;;;;;;;;;;;;;;;;;;;;;;;;;;;;;;;;;;;;;;;;;
               440  ;
               441  ;
02D4 3E80      442 I82501: MVI    A,80H         ;SET-UP TO LOAD BAUD DIVISOR
02D6 320390    443         STA    LCR           ;WRITE TO LCR, SET DLAB=1
02D9 3E68      444         MVI    A,68H         ;LSB OF DIVISOR, 8MHZ CRYSTAL
02DB 320090    445         STA    BAUDLS        ;4FH FOR 6MHZ CRYSTAL
02DE 3E00      446         MVI    A,00H         ;MSB OF DIVISOR
02E0 320190    447         STA    BAUDMS
02E3 3E07      448         MVI    A,07          ;8-BITS, NO PARITY, 2 STOP BITS
02E5 320390    449         STA    LCR           ;SET-UP OPERATING CONDITIONS
02E8 3E00      450         MVI    A,00H
02EA 320590    451         STA    ASTAT         ;CLEAR LINE STATUS REGISTER
02ED 3E01      452         MVI    A,01H         ;ENABLE DATA AVAILABLE INTERRUPT
02EF 320190    453         STA    DISINR        ;INTERRUPT ENABLE REGISTER
02F2 3E0F      454         MVI    A,0FH         ;ACTIVATE MODEM CONTROL LINES
02F4 320490    455         STA    LCR+1
02F7 C9        456         RET
               457 ;
               458 ;
02F8 215D03    459 I8273:  LXI    H,OPMODES
02FB CD3903    460         CALL   CMDOUT
02FE 215F03    461         LXI    H,SMODES
0301 CD3903    462         CALL   CMDOUT
0304 216203    463         LXI    H,DIAXS
0307 CD3903    464         CALL   CMDOUT
030A 216503    465         LXI    H,BITS
030D CD3903    466         CALL   CMDOUT
0310 216A03    467         LXI    H,RCV
0313 CD3903    468         CALL   CMDOUT
0316 C9        469         RET
               470 ;
               471 ;
0317 3E80      472 I82502: MVI    A,80H         ;SET-UP TO LOAD BAUD DIVISOR
0319 320380    473         STA    8003H         ;WRITE TO LCR, SET DLAB=1
031C 3E68      474         MVI    A,68H         ;LSB OF DIVISOR, 8MHZ CRYSTAL
031E 320080    475         STA    8000H         ;4FH FOR 6MHZ CRYSTAL
0321 3E00      476         MVI    A,00H         ;MSB OF DIVISOR
0323 320180    477         STA    8001H
0326 3E07      478         MVI    A,07          ;8-BITS, NO PARITY, 2 STOP BITS
0328 320380    479         STA    8003H         ;SET-UP OPERATING CONDITIONS
032B 3E00      480         MVI    A,00H
032D 320180    481         STA    8001H         ;CLEAR LINE STATUS REGISTER
0330 320580    482         STA    8005H         ;DISABLE INTERRUPTS
0333 3E0F      483         MVI    A,0FH
0335 320480    484         STA    8004H
0338 C9        485         RET
               486 ;
0339 0E30      487 CMDOUT: MVI    C,30H
033B 46        488         MOV    B,M
033C 23        489         INX    H
033D 3A0060    490 CMD1:   LDA    SSTAT
```

```
0340 07          491         RLC
0341 DA3D03      492         JC      CMD1
0344 7E          493         MOV     A,M
0345 320060      494         STA     SCMDRG
0348 78          495 CMD2:   MOV     A,B
0349 A7          496         ANA     A
034A C8          497         RZ
034B 23          498         INX     H
034C 05          499         DCR     B
034D 3A0060      500 CMD3:   LDA     SSTAT
0350 E620        501         ANI     20H
0352 C24D03      502         JNZ     CMD3
0355 7E          503         MOV     A,M
0356 320160      504         STA     SPRMRG
0359 C34803      505         JMP     CMD2
                 506 ;
                 507 ;
035C 01          508 OPMODES:    DB  01,91H,00000111B
035D 91
035E 07
035F 01          509 SMODES:     DB  01,0A0H,00000000B
0360 A0
0361 00
0362 01          510 DTAXS:      DB  01,97H,00000001B
0363 97
0364 01
0365 01          511 BITS:       DB  01,0A4H,00000000B
0366 A4
0367 00
0368 00          512 DR:         DB  00,0C5H
0369 C5
036A 02          513 RCV:        DB  02,0C0H,01H,00H
036B C0
036C 01
036D 00
                 514 ;
                 515 ;
                 516 ;
036E 3E04        517 IXMIT:  MVI     A,04H       ;FOUR PARAMETERS IN COMMAND
0370 32A74F      518         STA     XMIT        ;STORE IN RAM
0373 3EC8        519         MVI     A,0C8H      ;GENERAL TRANSMIT COMMAND
0375 32A84F      520         STA     XMIT+1
0378 3E13        521         MVI     A,13H       ;LSB OF PACKET LENGTH
037A 32A94F      522         STA     XMIT+2
037D 3E00        523         MVI     A,00H       ;MSB OF PACKET LENGTH
037F 32AA4F      524         STA     XMIT+3
0382 3EFF        525         MVI     A,0FFH      ;ADDRESS BYTE TO BE SENT
0384 32AB4F      526         STA     XMIT+4
0387 C9          527         RET
                 528 ;
                 529         END
```

PUBLIC SYMBOLS

EXTERNAL SYMBOLS
USER SYMBOLS

| ACKBYT A 4FB0 | ACKFLG A 4FA6 | ACKLOP A 0086 | ACKLP2 A 008C | ADATA A 9000 | AGAIN A 00EA | ASTAT A 9005 |
| BAD A 01B6 | BADR A 024E | BAUDLS A 9000 | BAUDMS A 9001 | BEGIN A 0040 | BITS A 0365 | BUFFER A 4000 |
| CMD1 A 033D | CMD2 A 0348 | CMD3 A 034D | CMDOUT A 0339 | CNTRL A 4FAC | CONT A 01A5 | CONTR A 0222 |
| COUNTS A FF0C | CRTBUF A 4FB1 | CURREN A 4FB3 | DATAIN A 011F | DATCRC A 0264 | DIN A 013E | DISINR A 9001 |
| DLOOK A 00FC | DR A 0368 | DTAXS A 0362 | EMPTY A 02C4 | GETACK A 0205 | GOODR A 022F | GOODTX A 0273 |

| | | | | | | | |
|---|---|---|---|---|---|---|---|
| HLOOK A 00CA | HLOOK2 A 00E2 | I82501 A 02D4 | I82502 A 0317 | I8273 A 02F8 | ID A 4FAC | INBYTE A 02B1 |
| INCOME A 4FA4 | INDONE A 015A | INLOOP A 008A | INF A 0107 | INPUTD A 012E | IXMIT A 036E | LCR A 9003 |
| MAIN A 005C | MLOOP A 007E | NOACK A 00A2 | OPMODE A 035C | OUTBYT A 01ED | OUTDAT A 018E | OVERFL A 01F9 |
| PACKET A 4FAD | POINTI A 4FA2 | POINTO A 4FA0 | PTINF A 4FB5 | RAM A 4000 | RCV A 036A | RESET A E000 |
| RESULT A 6001 | RETFLG A 0177 | RETRES A 0171 | RL1 A 0231 | RL2 A 0237 | RSTAT A 0298 | RSTATL A 02A5 |
| RXCALL A 025C | RXIR A 6003 | RXON A 01DC | SCMDRG A 6000 | SDATAI A B000 | SDATAO A 7000 | SMODES A 035F |
| SPRMRG A 6001 | SSTAT A 6000 | STATLP A 01C2 | STATUS A 4FB2 | TIME A 4FB7 | TURNON A 01D0 | TXIR A 6002 |
| TXON A 01D7 | TXSTAT A 4FA5 | TXSTRT A 0074 | UP13 A 0179 | XMIT A 4FA7 | | |

ASSEMBLY COMPLETE, NO ERRORS

APPENDIX II

ISIS-II 8080/8085 MACRO ASSEMBLER, V4.1    MODULE    PAGE  1

LOC  OBJ          LINE     SOURCE STATEMENT

```
                   1  ;;;;;;;;;;;;;;;;;;;;;;;;;;;;;;;;;;;;;;;;;;;;;;;;;;;;;
                   2  ;    COPYRIGHT 1985 ZENITH ELECTRONICS CORP.
                   3  ;THIS PROGRAM WAS WRITTEN GORDON E. REICHARD ON JUNE 12, 1985
                   4  ; THIS IS ONLY A PRELIMINARY VERSION OF THE PROGRAM.
                   5  ; THE PROGRAM IS CALLED Z-TLM300. THE NAME TLM300 IS THE
                   6  ; DIRECTORY NAME.
                   7  ; THIS PROGRAM IS USED TO RECEIVE DATA FROM THE Z-TCU100
                   8  ; LOCATION AT THE CENTRAL OFFICE. THE DATA FROM THAT POINT
                   9  ; IS CONVERTED, BUFFERED, AND LASTLY TRANSFERRED TO THE MUX
                  10  ; BOARD.
                  11  ;;;;;;;;;;;;;;;;;;;;;;;;;;;;;;;;;;;;;;;;;;;;;;;;;;;;;
                  12     ;
                  13     ;
                  14  ;;;;;;;;;;;;;;;;;;;;;;;;;;;;;;;;;;;;;;;;;;;;;;;;;;;;;
                  15  ; WHEN THE VARIABLE 'AREA' IS SET TO F0H, THE PROGRAM 'TABLE'
                  16  ; MUST BE USED TO PROGRAM THE 2732 EPROM (IC 7) WITH THE
                  17  ; CORRECT AREA CODE CONVERSIONS.
                  18  ;;;;;;;;;;;;;;;;;;;;;;;;;;;;;;;;;;;;;;;;;;;;;;;;;;;;;
                  19     ;
                  20     ;
                  21  ;;;;;;;;;;;;;;;;;;;;;;;;;;;;;;;;;;;;;;;;;;;;;;;;;;;;;
                  22  ; BELOW ARE THE EQUATE STATEMENTS ASSIGNING LABELS TO ADDRESS
                  23  ; VALUES.
                  24  ;;;;;;;;;;;;;;;;;;;;;;;;;;;;;;;;;;;;;;;;;;;;;;;;;;;;;
                  25     ;
                  26     ;
9000              27  ADATA   EQU   9000H       ;ASYNC DATA PORT, 8250
9000              28  BAUDLS  EQU   ADATA       ;LSB OF BAUD RATE
9001              29  BAUDMS  EQU   ADATA+1     ;MSB OF BAUD RATE
9003              30  LCR     EQU   ADATA+3     ;LINE CONTROL REG. 8250
9001              31  DISINR  EQU   ADATA+1     ;DISABLE INTERRUPT REG. 8250
9005              32  ASTAT   EQU   ADATA+5     ;ASYNC STATUS PORT, 8250
4000              33  RAM     EQU   4000H
4000              34  BUFFER  EQU   RAM         ;IN AND OUT BUFFER
6000              35  SCMDRG  EQU   6000H       ;SYNC COMMAND REG. 8273
6000              36  SSTAT   EQU   SCMDRG      ;SYNC STATUS REG. 8273
6001              37  SPRMRG  EQU   SCMDRG+1    ;SYNC PARAMETER REG.
6001              38  RESULT  EQU   SPRMRG      ;RESULT REGISTER
6002              39  TXIR    EQU   SCMDRG+2    ;TRANSMIT INTERRUPT REG.
6003              40  RXIR    EQU   SCMDRG+3    ;RECEIVER INTERRUPT REG.
4FA0              41  POINTO  EQU   4FA0H       ;OUTPUT POINTER
4FA2              42  POINTI  EQU   POINTO+2    ;INPUT POINTER
7000              43  SDATAO  EQU   7000H       ;SYNC DATA OUTPUT, 8273
B000              44  SDATAI  EQU   0B000H      ;SYNC DATA INPUT, 8273
4FA4              45  INCOME  EQU   POINTI+2    ;INCOMING DATA PACKET PENDING
```

```
4F65        46 TXSTAT  EQU  POINTI+3      ;CURRENT 8273 X-MIT STATUS
4F66        47 ACKFLG  EQU  POINTI+4      ;ACKNOWLEDGEMENT FLAG
4F67        48 XMIT    EQU  POINTI+5      ;START ADDRESS OF X-MIT SET-UP
4FAC        49 CNTRL   EQU  XMIT+5        ;CONTROL FIELD FOR SDLC FRAME
4FAE        50 PACKET  EQU  POINTI2+11    ;PACKETS REMAINING IN RAM
4FB7        51 GETID   EQU  4FB7H         ;INPUT DATA COUNTER, USED FOR GETTING ID
4FB6        52 CRTBUF  EQU  4FB6H         ;DATA HERE IS OUTPUT TO CRT
4FB5        53 STATUS  EQU  4FB5H         ;STATUS BYTE READ FROM 8273
4FB3        54 CURRENT EQU  4FB3H         ;CURRENT OUTPUT POINTER (ALSO 4FB4H)
E000        55 RESET   EQU  0E000H        ;WATCH DOG RESET CIRCUIT ADDRESS
            56 ;
00F0        57 AREA    EQU  0F0H          ;MSB BASE OF AREA CODE LOOK-UP TABLE
            58                            ;THIS VALUE SHOULD BE 10H FOR PROTO-TYPE USE
            59                            ;AND F0H FOR PRODUCTION USE.
4026        60 TOPOUT  EQU  4026H         ;STARTING ADDRESS OF OUTPUT BUFFER
4F8A        61 CNVRTP  EQU  4F8AH         ;LOCATION TO STORE CONVERTER POINTER
4F8C        62 TXFLG   EQU  4F8CH         ;LOCATION OF OUTPUT BUFFER READY FLAG
4F8D        63 DATAVA  EQU  4F8DH         ;FLAG TO DETERMINE WHETHER DATA IS AVA. FOR CN.
4F8E        64 SAMPAC  EQU  4F8EH         ;LOCATION WHICH HOLD REPEAT PACKET COUNT
4F8B        65 CNVRTH  EQU  CNVRTP+1      ;THIS LOCATION CONTAINS THE H REG.
4F90        66 HPCNVT  EQU  4F90H         ;BASE POINTER FOR DATA CONVERSION
4F92        67 HPSAVE  EQU  HPCNVT+2      ;OFFSET DATA CONVERSION POINTER
4F94        68 BYTE12  EQU  HPCNVT+4      ;HP OUTPUT, BYTES 1 AND 2
4F96        69 BYTE34  EQU  HPCNVT+6      ;BYTES 3 AND 4
4F98        70 BYTE56  EQU  HPCNVT+8      ;BYTES 5 AND 6
4F9A        71 BYTE78  EQU  HPCNVT+0AH    ;BYTES 7 AND 8
4F9C        72 VALUE   EQU  HPCNVT+0CH    ;LOCATION WHERE MULTIPLIED VALUE IS SAVED
4F9E        73 CNVBUF  EQU  HPCNVT+0EH    ;CONVERTER BUFFER FULL FLAG LOCATION
00FF        74 MUXRUN  EQU  0FFH          ;MUX COUNTER RUNNING AND NO RESET
001F        75 MRESET  EQU  1FH           ;RESET SIGNAL FOR THE MUX BOARD
002F        76 MSTOP   EQU  2FH           ;MUX STOP COUNTER SIGNAL
            77 ;
4FBA        78 ADDRES  EQU  4FBAH         ;ACK. PACKET ADDRESS BYTE LOCATION
4FBB        79 ID      EQU  ADDRES+1      ;PACKET ID BYTE LOCATION
4FBC        80 TXBYTE  EQU  ADDRES+2      ;ACKNOWLEDGE BYTE, A5=GOOD, C3=BAD
4FBD        81 TXPNT   EQU  ADDRES+3      ;ACK. OUTPUT BUFFER POINTER
            82 ;
0010        83 PORT4A  EQU  10H           ;IC4, 8255 PORT A
0011        84 PORT4B  EQU  11H           ;IC4, 8255 PORT B
0012        85 PORT4C  EQU  12H           ;IC4, 8255 PORT C
0013        86 CPORT4  EQU  13H           ;IC4, 8255 CONTROL PORT
0020        87 PORT5A  EQU  20H           ;IC5, 8255 PORT A
0023        88 CPORT5  EQU  23H           ;IC5, 8255 CONTROL PORT
D000        89 MUXWR   EQU  0D000H        ;USE THIS ADDRESS TO WRITE TO MUX BOARD
            90 ;
            91 ;
            92 ;;;;;;;;;;;;;;;;;;;;;;;;;;;;;;;;;;;;;;;;;;;;;;;;;;;;;;;;;;
            93 ; THIS IS THE LOOK-UP TABLE FOR THE AREA CODES.
            94 ;;;;;;;;;;;;;;;;;;;;;;;;;;;;;;;;;;;;;;;;;;;;;;;;;;;;;;;;;;
            95 ;
            96 ;
1314        97         ORG  1314H
1314 3F     98         DB   00111111B     ;314 AREA CODE
            99 ;
1312       100         ORG  1312H
1312 7F    101         DB   01111111B     ;312 AREA CODE
           102 ;
1815       103         ORG  1815H
1815 BF    104         DB   10111111B     ;815 AREA CODE
           105 ;
1414       106         ORG  1414H
1414 FF    107         DB   11111111B     ;414 AREA CODE
           108 ;
           109 ;
```

```
110 ;;;;;;;;;;;;;;;;;;;;;;;;;;;;;;;;;;;;;;;;;;;;;;;;;;;;;;;;;;;;;;;;
111 ; THIS IS THE LOOK-UP TABLE CONTAINING THE MULTIPLIERS USED
112 ; BYTE THE MULTI SUB-ROUTINE.
113 ;;;;;;;;;;;;;;;;;;;;;;;;;;;;;;;;;;;;;;;;;;;;;;;;;;;;;;;;;;;;;;;;
114         ;
115         ;
0A00              116         ORG     0A00H           ;LOOK-UP TABLE FOR ASCII CNVERSION
0A00 0000         117 LT1000: DW      0000H           ;0000
0A02 EB03         118         DW      03EBH           ;1000
0A04 D007         119         DW      07D0H           ;2000
0A06 B80B         120         DW      0BB8H           ;3000
0A08 A00F         121         DW      0FA0H           ;4000
0A0A 8813         122         DW      1388H           ;5000
0A0C 7017         123         DW      1770H           ;6000
0A0E 581B         124         DW      1B58H           ;7000
0A10 401F         125         DW      1F40H           ;8000
0A12 2823         126         DW      2328H           ;9000
                  127         ;
0B00              128         ORG     0B00H
0B00 0000         129 LT100:  DW      0000H           ;000
0B02 6400         130         DW      0064H           ;100
0B04 C800         131         DW      00C8H           ;200
0B06 2C01         132         DW      012CH           ;300
0B08 9001         133         DW      0190H           ;400
0B0A F401         134         DW      01F4H           ;500
0B0C 5802         135         DW      0258H           ;600
0B0E BC02         136         DW      02BCH           ;700
0B10 2003         137         DW      0320H           ;800
0B12 8403         138         DW      03E4H           ;900
                  139         ;
0C00              140         ORG     0C00H
0C00 00           141 LT10:   DB      00H             ;00
0C01 0A           142         DB      0AH             ;10
0C02 14           143         DB      14H             ;20
0C03 1E           144         DB      1EH             ;30
0C04 28           145         DB      28H             ;40
0C05 32           146         DB      32H             ;50
0C06 3C           147         DB      3CH             ;60
0C07 46           148         DB      46H             ;70
0C08 50           149         DB      50H             ;80
0C09 5A           150         DB      5AH             ;90
                  151         ;
                  152         ;
                  153         ;
                  154         ;
155 ;;;;;;;;;;;;;;;;;;;;;;;;;;;;;;;;;;;;;;;;;;;;;;;;;;;;;;;;;;;;;;;;
156 ; THIS IS THE BEGINNING OF THE PROGRAM. THIS PORTION OF THE
157 ; PROGRAM TO THE START OF THE MAIN BODY OF THE PROGRAM PERFORMS
158 ; REGITER AND CHIP INITIALIZATION.
159 ;;;;;;;;;;;;;;;;;;;;;;;;;;;;;;;;;;;;;;;;;;;;;;;;;;;;;;;;;;;;;;;;
                  160         ;
                  161         ;
0000              162         ORG     0000H
0000 F3           163         DI
0001 3E1E         164         MVI     A,1EH           ;EN-...
0003 30           165         SIM                     ;SET INTERRUPT MASK
0004 210040       166         LXI     H,RAM           ;SET ALL POINTERS TO TOP OF RAM
0007 22B34F       167         SHLD    CURRENT
000A 22A24F       168         SHLD    POINTI
000D 22A04F       169         SHLD    POINTO
0010 22904F       170         SHLD    HPCNVT
0013 22924F       171         SHLD    HPSAVE
0016 21BA4F       172         LXI     H,ADDRES
```

```
0019 22BD4F    173           SHLD    TXPNT       ;SET ACK. TRANSMIT OUTPUT POINTER
001C 21264C    174           LXI     H,TOPOUT
001F 22BA4F    175           SHLD    CNVPTF      ;SET-UP OUTPUT BUFFER POINTER
0022 C34000    176           JMP     BEGIN
               177           ;
002C           178           ORG     002CH       ;RST 5.5
002C C30701    179           JMP     INPDAT
               180           ;
0034           181           ORG     0034H       ;RST 6.5
0034 C3ED01    182           JMP     OUTACK
               183           ;
003C           184           ORG     003CH       ;RST 7.5
003C C38102    185           JMP     OUTCKT
               186           ;
0040           187           ORG     0040H       ;BEGINNING OF MAIN PROGRAM
0040 01FFFF    188  BEGIN:   LXI     B,0FFFFH
0043 3200E0    189  TL1:     STA     RESET       ;HIT RESET CIRCUIT
0046 0B        190           DCX     B
0047 78        191           MOV     A,B
0048 A7        192           ANA     A
0049 C24300    193           JNZ     TL1
004C 79        194           MOV     A,C
004D A7        195           ANA     A
004E C24300    196           JNZ     TL1
0051 310050    197  START:   LXI     SP,5000H    ;SET STACK POINTER TO TOP
0054 CD9902    198           CALL    I8250I
0057 CDDC02    199           CALL    I8250Z
005A CDBD02    200           CALL    I8273
005D CD3303    201           CALL    IXMIT       ;SET-UP OUTPUT ARRAY
0060 CD4B03    202           CALL    I8255
0063 3E00      203           MVI     A,00H
0065 32B64F    204           STA     ID          ;STORE PACKET ID
0068 32AD4F    205           STA     PACKET      ;ZERO PACKET COUNT
006B 32B74F    206           STA     GETID       ;RESET DATA COUNTER TO GET ID
006E 329E4F    207           STA     CNVBUF      ;RESET CONVERT BUFFER EMPTY FLAG
0071 328C4F    208           STA     TXFLG       ;NO DATA READY FOR TRANSFER TO HP
0074 3E0F      209           MVI     A,0FH       ;SET REPEAT PACKET COUNT TO 15
0076 328E4F    210           STA     SAMPAC
0079 3EFF      211           MVI     A,0FFH      ;ADDRESS TO BE SENT IN ALL ACK. PACKETS
007B 32BA4F    212           STA     ADDRES
               213           ;
               214  ;;;;;;;;;;;;;;;;;;;;;;;;;;;;;;;;;;;;;;;;;;;;;;;;;;;;;;;;;;;;;
               215  ; THIS MARKS THE START OF THE MAIN BODY OF THE PROGRAM. FROM THIS
               216  ; MAIN BODY, ALL OTHER ROUTINES ARE CALLED. THIS PORTION OF THE
               217  ; PROGRAM CONTROLS THE FLOW OF PROGRAM OPERATION.
               218  ;;;;;;;;;;;;;;;;;;;;;;;;;;;;;;;;;;;;;;;;;;;;;;;;;;;;;;;;;;;;;
               219           ;
               220           ;
007E 3A8C4F    221  RECON:   LDA     TXFLG       ;SEE IF THERE IS DATA READY FOR TRANSFER
0081 A7        222           ANA     A           ;SEE IF THERE ARE ANY PACKETS READY FOR XMIT
0082 CAA700    223           JZ      MLOOP       ;IF NOT, WAIT TO RECEIVE
0085 20        224           RIM                 ;ELSE, SEE IF BOARD IS SELECTED
0086 07        225           RLC
0087 DC3E02    226           CC      HPOUT       ;IF SO, OUTPUT CONVERTED DATA PACKET (CC)
008A 212F03    227           LXI     H,RCV       ;ELSE, PREPARE TO RECEIVE WHILE WAITING
               228                               ;TO TRANSFER TO MUX BOARD
008D CDFE02    229           CALL    CMDOUT
0090 FB        230  MLOOP3:  EI
0091 3200E0    231           STA     RESET
0094 00        232           NOP
0095 00        233           NOP
0096 F3        234           DI
0097 3A8C4F    235           LDA     TXFLG       ;HAS TRANSFER OCCURRED
```

```
009A A7         236         ANA     A
009B CAAD00     237         JZ      MLOOP2          ;IF SO, RETURN TO ORIGINAL LOOP
009E 20         238         RIM                     ;GET CURRENT INTERRUPT STATUS
009F 07         239         RLC                     ;SEE IF BOARD IS BEING SELECTING
00A0 DC3E02     240         CC      HPOJT           ;IF SO, BEGIN TRANSFER TO MUX BOARD
00A3 FB         241         EI                      ;ELSE ENABLE INTERRUPTS AND CONTINUE WAITING
00A4 C39000     242         JMP     MLOOP3
                243         ;
00A7 212F03     244 MLOOP:  LXI     H,RCV           ;PREPARE TO TURN-ON RECEIVER
00AA CDFE02     245         CALL    CMDOUT          ;OUTPUT COMMANDS
00AD FB         246 MLOOP2: EI                      ;ENABLE INTERRUPTS AND WAIT FOR DATA
00AE 3200E0     247         STA     RESET           ;HIT THE RESET CIRCUIT
00B1 3A0060     248         LDA     SSTAT           ;GET CURRENT STATUS FROM 8372
00B4 00         249         NOP
00B5 00         250         NOP
00B6 C3AD00     251         JMP     MLOOP2
                252         ;
                253         ;
00B9 3A9E4F     254 TXSTRT: LDA     CNVBUF          ;GET CONVERT BUFFER FLAG
00BC A7         255         ANA     A               ;IS THE CONVERTER BUFFER FULL
00BD C2E800     256         JNZ     TX1             ;IF NOT, CONTINUE
00C0 3A8D4F     257         LDA     DATAVA          ;SEE IF VALID DATA IS AVAILABLE FOR CONVERSION
00C3 A7         258         ANA     A
00C4 CAE800     259         JZ      TX1             ;IF NOT DATA AVAILABLE, BEGIN RETRANSMISSION
00C7 2A904F     260         LHLD    HPCNVT          ;ELSE PREPARE TO CONVERT DATA PACKET
00CA 3E10       261         MVI     A,10H
00CC CD5D03     262         CALL    OFFSET
00CF 22924F     263         SHLD    HPSAVE
00D2 CD6403     264         CALL    CNVRT3          ;CONVERT DATA PACKET
00D5 2A904F     265         LHLD    HPCNVT
00D8 3E13       266         MVI     A,13H
00DA CD5D03     267         CALL    OFFSET          ;UPDATE DATA CONVERTER POINTER TO POINT
                268                                 ;AT NEXT DATA PACKET TO BE CONVERTED
00DD 3E26       269         MVI     A,26H
00DF BD         270         CMP     L               ;IS REG. L READY TO BE RESET TO LOCATION 1
00E0 C2E500     271         JNZ     TXCONT          ;IF NOT CONTINUE
00E3 2E00       272         MVI     L,00H           ;ELSE RESET TO LOCATION 1
00E5 22904F     273 TXCONT: SHLD    HPCNVT          ;STORE NEW VALUE OF CONVERTER POINTER
00E8 21A74F     274 TX1:    LXI     H,XMIT          ;PREPARE TO TURN-ON TRANSMITTER
00EB CDFE02     275         CALL    CMDOUT          ;OUTPUT COMMANDS
00EE FB         276 TXLOOP: EI
00EF 3200E0     277         STA     RESET
00F2 00         278         NOP
00F3 C3EE00     279         JMP     TXLOOP
                280         ;
                281         ;
                282 ;;;;;;;;;;;;;;;;;;;;;;;;;;;;;;;;;;;;;;;;;;;;;;;;;;;;;;;
                283 ; THIS ROUTINE CHECKS THE POINTER VALUE IN THE H&L REGISTER
                284 ; PAIR TO INSURE THAT IT IS NOT OUT-OF-RANGE
                285 ; THE OUTPUT BUFFER IS DESIGNED TO HOLD 480 8-BYTE PACKETS IN
                286 ; THE RANGE FROM 4026H TO 4F26H.
                287 ;;;;;;;;;;;;;;;;;;;;;;;;;;;;;;;;;;;;;;;;;;;;;;;;;;;;;;;
                288         ;
                289         ;
00F6 7D         290 OVERFL: MOV     A,L             ;MOVE LSB OF POINTER INTO A
00F7 FE26       291         CPI     26H
00F9 C0         292         RNZ
00FA 7C         293         MOV     A,H             ;MOVE MSB OF POINTER INTO A
00FB FE4F       294         CPI     4FH
00FD C0         295         RNZ
00FE 212640     296         LXI     H,TOPOUT        ;IF POINTER IS 4F26H, RESET TO TOP
                297                                 ;OF OUTPUT BUFFER
0101 3EFF       298         MVI     A,0FFH          ;SET CONVERTER BUFFER FULL FLAG (OUTPUT BUF)
```

```
0103 329E4F     299         STA     CNVBUF
0106 C9         300         RET
                301     ;
                302     ;
                303     ;
                304 ;;;;;;;;;;;;;;;;;;;;;;;;;;;;;;;;;;;;;;;;;;;;;;;;;;;;;;;;;
                305 ; THIS ROUTINE INPUTS A DATA BYTE FROM THE 8273, THIS ROUTINE
                306 ; ALSO CHECKS FOR TRANSMISSIONS ERRORS AS WELL AND THE END-
                307 ; OF-MESSAGE FLAG.
                308 ;;;;;;;;;;;;;;;;;;;;;;;;;;;;;;;;;;;;;;;;;;;;;;;;;;;;;;;;;
                309     ;
                310     ;
0107 3E0E       311 INFDAT: MVI  A,0EH      ;SET INTERRUPT MASK TO OUTPUT
0109 30         312         SIM             ;TO CRT.
010A 3A0060     313         LDA  SSTAT      ;GET STATUS WORD FROM 8273
010D 32B54F     314         STA  STATUS     ;STORE STATUS WORD
0110 E602       315         ANI  02H        ;IS THERE A RECEIVER INTERRUPT RESULT
0112 CAB001     316         JZ   INBYTE     ;IF NOT, INPUT DATA IS AVAILABLE
0115 3AB54F     317         LDA  STATUS     ;ELSE, READ STATUS BYTE & DETERMINE RESULT
0118 E610       318         ANI  10H        ;IS IT AN IMMEDIATE RESULT
011A CA2101     319         JZ   CONTR      ;IF NOT CONTINUE
011D 3A0160     320         LDA  RESULT     ;ELSE, READ RESULT
0120 C9         321         RET
0121 3A0360     322 CONTR:  LDA  RXIR       ;GET RECEIVER INTERRUPT RESULT
0124 FE03       323         CPI  03H        ;IS THERE A CRC ERROR
0126 CA6D01     324         JZ   DATCRC     ;IF SO, SEE WANT KIND
0129 E60F       325         ANI  0FH        ;IS PACKET RECEIVED COMPLETE AND ERROR FREE
012B 3E00       326         MVI  A,00H      ;RESET DATA INPUT COUNTER
012D 32B74F     327         STA  GETID
0130 CA3F01     328         JZ   GOODR      ;IF SO, GOTO GOOD RECEIVE
0133 3EC3       329 BADR:   MVI  A,0C3H     ;NEGATIVE ACKNOWLEDGEMENT BYTE
0135 32BC4F     330         STA  TXBYTE     ;STORE IN BYTE TO BE TRANSMITTED LOACTION
0138 21E800     331         LXI  H,TX1      ;SET RETURN POINTER TO TRANSMIT NACK
013B E3         332         XTHL            ;SWITCH WITH STACK
013C C34B01     333         JMP  RSTAT      ;GOTO STATUS LOOP
013F 3EA5       334 GOODR:  MVI  A,0A5H     ;POSITIVE ACKNOWLEDGEMENT
0141 32BC4F     335         STA  TXBYTE
0144 32BD4F     336         STA  DATAVA     ;SET DATA AVAILABLE FLAG
0147 21B900     337         LXI  H,TXSTRT   ;SET RETURN VECTOR TO CONVERT DATA AND TRANS.
014A E3         338         XTHL            ;SWITCH WITH STACK
014B 00         339 RSTAT:  NOP
014C 00         340         NOP
014D 00         341         NOP
014E 00         342         NOP
014F 00         343         NOP
0150 00         344         NOP
0151 3E08       345         MVI  A,08H      ;ENABLE ALL INTERRUPTS
0153 30         346         SIM
0154 3E0D       347         MVI  A,0DH      ;PUT CARRIAGE RETURN INTO CRT BUFFER
0156 32B64F     348         STA  CRTBUF     ;PUT CARRIAGE RETURN IN CRT BUFFER
0159 3A0060     349 RSTATL: LDA  SSTAT      ;READ STATUS
015C E608       350         ANI  08H        ;ANY RECEIVER INTERRUPTS PENDING
015E C8         351         RZ              ;IF NO RETURN
015F 3A0060     352         LDA  SSTAT      ;ELSE, READ STATUS AGAIN TO CHECK FOR RXIR
0162 E602       353         ANI  02H        ;IS A RXIR AVAILABLE
0164 CA5901     354         JZ   RSTATL     ;IF NOT, WAIT
0167 3A0360     355         LDA  RXIR       ;ELSE, READ INTERRUPT RESULT BYTE
016A C35901     356         JMP  RSTATL     ;CHECK TO SEE IF ANY MORE RESULTS EXIST
                357     ;
016D 3AB74F     358 DATCRC: LDA  GETID      ;SEE IF ANY DATA HAS BEEN INPUT YET
0170 A7         359         ANA  A          ;SEE IF ZERO
0171 C27801     360         JNZ  BADCRC
0174 3E0A       361         MVI  A,0AH      ;ENABLE 7.5 AND 5.5
```

```
0176 30              362         SIM
0177 C9              363         RET
0178 3E00            364 BADCRC: MVI    A,00H
017A 32B74F          365         STA    GETID          ;CLEAR HEADER COUNTER
017D C33301          366         JMP    BADR
                     367         ;
0180 3E0E            368 INBYTE: MVI    A,0EH          ;SET INTERRUPT MASK TO INPUT SERIAL DATA
0182 30              369         SIM
0183 3AB74F          370         LDA    GETID          ;GET DATA INPUT COUNTER
0186 E603            371         ANI    03H            ;SEE IF DATA, ID, OR ADDRESS IS EXPECTED
0188 C29401          372         JNZ    REALDT         ;IF 2 OR 3, INPUT BYTE IS DATA OR ID
018B 3E02            373         MVI    A,02H
018D 32B74F          374         STA    GETID          ;STORE 2, ADDRESS ALREADY RECEIVED
0190 3A00B0          375         LDA    SDATAI         ;READ ADDRESS TO CLEAR INTERRUPTS
0193 C9              376         RET
0194 FE02            377 REALDT: CPI    02H            ;IS BYTE DATA OR ID
0196 C2DE01          378         JNZ    GETBYT         ;IF VALUE IS 2, INPUT BYTE IS ID
0199 3E03            379         MVI    A,03H
019B 32B74F          380         STA    GETID          ;STORE 3, ID AND ADDRESS ALREADY RECEIVED
019E 3A00B0          381         LDA    SDATAI         ;READ INPUT BYTE, ID
01A1 47              382         MOV    B,A            ;PUT ID INTO REG. B
01A2 3AB84F          383         LDA    ID             ;GET PREVIOUS PACKET ID
01A5 B8              384         CMP    B              ;ARE THEY THE SAME
01A6 C2BB01          385         JNZ    NEWPAC         ;IF NOT, THIS PACKET IS NOT A RETRANS.
01A9 218E4F          386 SAMEPC: LXI    H,SAMPAC       ;PUT LOCATION OF REPEAT PACKET COUNT INTO HL
01AC 35              387         DCR    M              ;DECREMENT CURRENT REPEAT PACKET COUNT
01AD CAB701          388         JZ     RSLOP          ;IF 15 REPEAT HAVE BEEN RECEIVED, RESET BOARD
01B0 2AA24F          389         LHLD   POINTI         ;ELSE, PACKET IS RETRANS. RESET POINTERS
01B3 22B34F          390         SHLD   CURRENT
01B6 C9              391         RET
01B7 00              392 RSLOP:  NOP                   ;THIS IS A INFINITE LOOP TO RESET BOARD
01B8 C3B701          393         JMP    RSLOP
01BB 78              394 NEWPAC: MOV    A,B            ;PUT NEWLY READ ID BACK INTO A
01BC 32B84F          395         STA    ID             ;STORE NEW PACKET ID
01BF 2AB34F          396         LHLD   CURRENT        ;SINCE NEW DATA, UPDATE POINTERS
01C2 7D              397         MOV    A,L            ;PUT REG. L INTO A
01C3 FE26            398         CPI    26H            ;HAS INPUT LOCATION 2 BEEN LOADED
01C5 C2CA01          399         JNZ    NEWCON         ;IF NOT, PUT DATA THERE
01C8 2E00            400         MVI    L,00H          ;ELSE, PUT DATA IN LOCATION 1
01CA 22B34F          401 NEWCON: SHLD   CURRENT
01CD 22A24F          402         SHLD   POINTI
01D0 3AAD4F          403         LDA    PACKET         ;GET CURRENT PACKET COUNT
01D3 FED0            404         CPI    0D0H           ;IS PACKET COUNT AT MAXIMUM
01D5 C8              405         RZ                    ;IF SO, RETURN
01D6 3C              406         INR    A              ;ELSE, INCREMENT THE PACKET COUNT
01D7 32AD4F          407         STA    PACKET         ;STORE UPDATED VALUE
01DA C9              408         RET
01DB 3E0A            409 GETBYT: MVI    A,0AH          ;SET INTERRUPT MASK TO OUTPUT TO CRT
01DD 30              410         SIM
01DE 2AB34F          411         LHLD   CURRENT        ;GET CURRENT INPUT POINTER
01E1 3A00B0          412         LDA    SDATAI         ;GET INPUT DATA BYTE
01E4 77              413         MOV    M,A            ;SAVE BYTE IN RAM
01E5 32B64F          414         STA    CRTBUF         ;PUT DATA BYTE IN CRT OUTPUT BUFFER
01E8 23              415         INX    H
01E9 22B34F          416         SHLD   CURRENT        ;STORE UPDATED POINTER
01EC C9              417         RET
                     418         ;
                     419         ;
                     420 ;;;;;;;;;;;;;;;;;;;;;;;;;;;;;;;;;;;;;;;;;;;;;;;;;;;;;;;;;;
                     421 ; THIS ROUTINE OUTPUTS A SINGLE DATA BYTE TO THE 8273 UPON
                     422 ; REQUEST. THIS ROUTINE ALSO CHECKS FOR TRANSMISSION ERRORS AND
                     423 ; END-OF-MESSAGE INTERRUPTS.
                     424 ;;;;;;;;;;;;;;;;;;;;;;;;;;;;;;;;;;;;;;;;;;;;;;;;;;;;;;;;;;
```

```
                         425          ;
                         426          ;
                         427          ;
01ED 3A0060              428 OUTACK: LDA    SSTAT      ;GET STATUS FROM 8273
01F0 32B54F              429         STA    STATUS     ;STORE CURRENT STATUS
01F3 E601                430         ANI    01H        ;IS THERE AN INTERRUPT RESULT AVAIL.
01F5 CA3202              431         JZ     OUTBYT     ;IF NOT, OUTPUT DATA BYTE
01F8 3AB54F              432         LDA    STATUS     ;GET PREVIOUSLY READ STATUS BYTE
01FB E610                433         ANI    10H        ;IS THERE AN IMMEDIATE RESULT AVAIL.
01FD CA0402              434         JZ     CONT       ;IF NOT CONTINUE ON
0200 3A0160              435         LDA    6001H      ;IF SO, READ RESULT
0203 C9                  436         RET
0204 3A0260              437 CONT:   LDA    TXIR       ;READ INTERRUPT RESULT BYTE
0207 FE00                438         CPI    00H        ;IS PACKET COMPLETE AND ERROR FREE
0209 C21602              439         JNZ    BAD        ;IF NOT, GOTO TO BAD
020C 21BA4F              440         LXI    H,ADDRES   ;ELSE, RESET ACK. BUFFER POINTER
020F 22B04F              441         SHLD   TXPNT
0212 C31C02              442         JMP    STATLP     ;CHECK AGAIN
0215 00                  443         NOP               ;TURN RECEIVER ON AT THIS POINT
0216 21BA4F              444 BAD:    LXI    H,ADDRES
0219 22B04F              445         SHLD   TXPNT
                         446         ;
021C 3A0060              447 STATLP: LDA    SSTAT      ;GET STATUS BYTE TO CHECK FOR RESULTS
021F E601                448         ANI    01H        ;ARE THERE ANY MORE RESULTS AVAILABLE
0221 CA2A02              449         JZ     TURNON     ;IF NO RESULTS, RETURN (RZ)
0224 3A0260              450         LDA    TXIR       ;READ INTERRUPT RESULT BYTE
0227 C31C02              451         JMP    STATLP     ;CHECK FOR MORE RESULT BYTES
022A 217E00              452 TURNON: LXI    H,RECON    ;LOAD HL WITH RETURN ADDRESS
022D E3                  453         XTHL              ;PUT ON TOP OF STACK
022E 3E0E                454         MVI    A,0EH      ;SET INTR. MASK TO RECEIVE
0230 30                  455         SIM
0231 C9                  456         RET
0232 2AB04F              457 OUTBYT: LHLD   TXPNT      ;GET CURRENT ACK. OUTPUT DATA POINTER
0235 7E                  458         MOV    A,M        ;PUT DATA BYTE INTO A
0236 320070              459         STA    SDATAO     ;OUTPUT DATA TO 8273
0239 23                  460         INX    H
023A 22B04F              461         SHLD   TXPNT      ;STORE UPDATED ACK. OUPUT POINTER
023D C9                  462         RET
                         463         ;
                         464         ;
                         465 ;;;;;;;;;;;;;;;;;;;;;;;;;;;;;;;;;;;;;;;;;;;;;;;;;;;;;;;;;;;
                         466 ; THIS ROUTINE OUTPUT 8-BIT PARALLEL DATA TO THE MUX BOARD VIA
                         467 ; THE 8255 I/O CHIP. IC4 PORT B IS USED FOR THIS PURPOSE.
                         468 ;;;;;;;;;;;;;;;;;;;;;;;;;;;;;;;;;;;;;;;;;;;;;;;;;;;;;;;;;;;
                         469         ;
                         470         ;
023E 3E2F                471 HPOUT:  MVI    A,MSTOP    ;PREPARE TO STOP MUX BOARD FROM POLLING
0240 D320                472         OUT    PORT5A     ;PULL MUX STOP LINE HIGH
0242 20                  473         RIM               ;SEE IF THIS BOARD IS STILL SELECTED
0243 07                  474         RLC
0244 DA4C02              475         JC     HPLOP1     ;IF STILL SELECTED, BEGIN OUTPUTTING (JC)
0247 3EFF                476         MVI    A,MUXRUN   ;ELSE, RELEASE MUX BOARD AND RETURN
0249 D320                477         OUT    PORT5A     ;RESET STOP LINE LOW
024B C9                  478         RET
                         479         ;
024C 3E0C                480 HPLOP1: MVI    A,00001100B ;PREPARE TO ENABLE OUTPUTS ON 74LS245
024E D313                481         OUT    CPORT4     ;RESET BIT 6, PORT 4C
0250 212640              482         LXI    H,TOPOUT   ;PUT OUTPUT DATA POINTER INTO H AND L
0253 7E                  483 HPLOP2: MOV    A,M        ;GET DATA BYTE
0254 D311                484         OUT    PORT4B     ;OUTPUT TO MUX BOARD
0256 00                  485         NOP               ;ALLOW OUTPUT DATA TO STABLIZE
0257 00                  486         NOP
0258 3200D0              487         STA    MUXWR      ;STROBE DATA INTO MUX BOARD
```

```
025B 23          489         INX     H               ;INCREMENT OUTPUT POINTER AND CONTINUE
025C 3AB4AF      489         LDA     CNVRTP          ;GET ADDRESS OF LAST CONVERTED PACKET
025F BD          490         CMP     L               ;HAS ALL CONVERTED DATA BEEN TRANSFERRED
0260 C25302      491         JNZ     HPLOP2          ;IF NOT, CONTINUE TRANSFER PROCESS
0263 3AB54F      492         LDA     CNVRTH          ;GET MSB OF ADDRESS
0266 BC          493         CMP     H               ;DO THEY MATCH
0267 C25302      494         JNZ     HPLOP2          ;IF NOT, CONTINUE TRANSFER
                 495         ;
026A 3E0B        496 OUTDON: MVI     A,00001101B     ;DISABLE OUTPUT ON 74LS245
026C D313        497         OUT     CPORT4          ;SET BIT 6, PORT 4C
026E 3EFF        498         MVI     A,MUXRUN        ;PREPARE TO RELEASE MUX BOARD
0270 D320        499         OUT     PORT5A          ;STOP LINE LOW
0272 3E00        500         MVI     A,00H
0274 329E4F      501         STA     CNVBUF          ;RESET BUFFER FULL FLAG
0277 328C4F      502         STA     TXFLG           ;RESET TXFLG, NO DATA READY FOR TRANSFER
027A 212640      503         LXI     H,TOPOUT        ;RESET CONVERTER POINTER TO TOP-OF-BUFFER
027D 22BA4F      504         SHLD    CNVRTP
0280 C9          505         RET
                 506         ;
                 507         ;
                 508 ;;;;;;;;;;;;;;;;;;;;;;;;;;;;;;;;;;;;;;;;;;;;;;;;;;;;;;;;;;;;;;;
                 509 ; THIS IS THE ROUTINE TO OUTPUT THE INPUT DATA TO THE CRT CONSOLE.
                 510 ; DATA TO BE OUTPUT IS PLACED IN THE CRTBUF PRIOR TO THE CALLING
                 511 ; OF THIS ROUTINE.
                 512 ;;;;;;;;;;;;;;;;;;;;;;;;;;;;;;;;;;;;;;;;;;;;;;;;;;;;;;;;;;;;;;;
                 513         ;
                 514         ;
0281 3AB64F      515 OUTCRT: LDA     CRTBUF          ;GET DATA BYTE TO BE OUTPUT
0284 320090      516         STA     ADATA           ;OUTPUT DATA TO CRT VIA J5 OR J3, (IC1)
0287 FE0D        517         CPI     0DH             ;WAS OUTPUT BYTE A CR
0289 CA9002      518         JZ      PUTLF           ;IF SO, PREPARE TO OUTPUT LF
028C 3E1C        519         MVI     A,1CH           ;SET INTERRUPT MASK TO WAIT FOR INPUT INTR.
028E 30          520         SIM
028F C9          521         RET
0290 3E1C        522 PUTLF:  MVI     A,1CH           ;ENABLE BOTH 6.5 ONLY
0292 30          523         SIM
0293 3E0A        524         MVI     A,0AH           ;PUT LF IN CRT BUFFER
0295 32B64F      525         STA     CRTBUF
0298 C9          526         RET
                 527         ;
                 528 ;;;;;;;;;;;;;;;;;;;;;;;;;;;;;;;;;;;;;;;;;;;;;;;;;;;;;;;;;;;;;;;
                 529 ; BELOW ARE THE ROUTINES TO SET-UP AND INITIALIZE THE 8250'S
                 530 ; AND THE 8273.
                 531 ;;;;;;;;;;;;;;;;;;;;;;;;;;;;;;;;;;;;;;;;;;;;;;;;;;;;;;;;;;;;;;;
                 532         ;
                 533         ;
0299 3E80        534 I82501: MVI     A,80H           ;SET-UP TO LOAD BAUD DIVISOR
029B 320390      535         STA     LCR             ;WRITE TO LCR, SET DLAB=1
029E 3E34        536         MVI     A,34H           ;LSB OF DIVISOR, 8MHZ CRYSTAL (2400)
02A0 320090      537         STA     BAUDLS          ;4FH FOR 6MHZ CRYSTAL
02A3 3E00        538         MVI     A,00H           ;MSB OF DIVISOR
02A5 320190      539         STA     BAUDMS
02A8 3E07        540         MVI     A,07            ;8-BITS, NO PARITY, 2 STOP BITS
02AA 320390      541         STA     LCR             ;SET-UP OPERATING CONDITIONS
02AD 3E00        542         MVI     A,00H
02AF 320590      543         STA     ASTAT           ;CLEAR LINE STATUS REGISTER
02B2 3E02        544         MVI     A,02H           ;ENABLE TX BUFFER EMPTY INTERRUPT
02B4 320190      545         STA     DISINR          ;INTERRUPT ENABLE REGISTER
02B7 3E0F        546         MVI     A,0FH           ;ACTIVATE MODEM CONTROL LINES
02B9 320490      547         STA     LCR+1
02BC C9          548         RET
                 549 ;
                 550 ;
```

```
02BD 212103    551 I8273:  LXI    H,OPMODES
02C0 CDFE02    552         CALL   CMDOUT
02C3 212403    553         LXI    H,SMODES
02C6 CDFE02    554         CALL   CMDOUT
02C9 212703    555         LXI    H,DTAXS
02CC CDFE02    556         CALL   CMDOUT
02CF 212A03    557         LXI    H,BITS
02D2 CDFE02    558         CALL   CMDOUT
02D5 212F03    559         LXI    H,RCV
02D8 CDFE02    560         CALL   CMDOUT
02DB C9        561         RET
               562 ;
               563 ;
02DC 3E80      564 I82502: MVI    A,80H           ;SET-UP TO LOAD BAUD DIVISOR
02DE 320380    565         STA    8003H           ;WRITE TO LCR, SET DLAB=1
02E1 3E68      566         MVI    A,68H           ;LSB OF DIVISOR, 8MHZ CRYSTAL
02E3 320080    567         STA    8000H           ;4FH FOR 6MHZ CRYSTAL
02E6 3E00      568         MVI    A,00H           ;MSB OF DIVISOR
02E8 320180    569         STA    8001H
02EB 3E07      570         MVI    A,07            ;8-BITS, NO PARITY, 2 STOP BITS
02ED 320380    571         STA    8003H           ;SET-UP OPERATING CONDITIONS
02F0 3E00      572         MVI    A,00H
02F2 320180    573         STA    8001H           ;CLEAR LINE STATUS REGISTER
02F5 320580    574         STA    8005H           ;DISABLE INTERRUPTS
02F8 3E0F      575         MVI    A,0FH
02FA 320480    576         STA    8004H
02FD C9        577         RET
               578 ;
02FE 0E30      579 CMDOUT: MVI    C,30H
0300 46        580         MOV    B,M
0301 23        581         INX    H
0302 3A0060    582 CMD1:   LDA    SSTAT
0305 07        583         RLC
0306 DA0203    584         JC     CMD1
0309 7E        585         MOV    A,M
030A 320060    586         STA    SCMREG
030D 78        587 CMD2:   MOV    A,B
030E A7        588         ANA    A
030F C8        589         RZ
0310 23        590         INX    H
0311 05        591         DCR    B
0312 3A0060    592 CMD3:   LDA    SSTAT
0315 E620      593         ANI    20H
0317 C21203    594         JNZ    CMD3
031A 7E        595         MOV    A,M
031B 320160    596         STA    SPRMRG
031E C30D03    597         JMP    CMD2
               598 ;
               599 ;
0321 01        600 OPMODES: DB    01,91H,00000011B  ;NON-BUFFERED MODE
0322 91
0323 03
0324 01        601 SMODES: DB     01,0A0H,00000000B
0325 A0
0326 00
0327 01        602 DTAXS:  DB     01,97H,00000001B
0328 97
0329 01
032A 01        603 BITS:   DB     01,0A4H,00000000B
032B A4
032C 00
032D 00        604 DR:     DB     00,0C5H
032E C5
```

```
032F 02      605 RCV:       DB      02,0C0H,15H,00H      ;RECEIVE 19 BYTES
0330 C0
0331 15
0332 00
             606 ;                                       ;PLUS ADDRESS AND ID
             607 ;
             608 ;
0333 3E02    609 IXMIT: MVI  A,02H                ;TWO PARAMETERS IN COMMAND
0335 32A74F  610        STA  XMIT                 ;STORE IN RAM
0338 3EC3    611        MVI  A,0C3H               ;GENERAL TRANSMIT COMMAND
033A 32A84F  612        STA  XMIT+1
033D 3E03    613        MVI  A,03H                ;LSB OF PACKET LENGTH
033F 32A94F  614        STA  XMIT+2
0342 3E00    615        MVI  A,00H                ;MSB OF PACKET LENGTH
0344 32AA4F  616        STA  XMIT+3
0347 C9      617        RET
             618 ;
             619 ;
             620 ;;;;;;;;;;;;;;;;;;;;;;;;;;;;;;;;;;;;;;;;;;;;;;;;;;;;;;;;;;;;;;
             621 ; THIS ROUTINE INITIALIZES BOTH 8255 CHIPS.
             622 ;;;;;;;;;;;;;;;;;;;;;;;;;;;;;;;;;;;;;;;;;;;;;;;;;;;;;;;;;;;;;;
             623 ;
             624 ;
0348 3E90    625 I8255: MVI  A,10010000B          ;CONTROL WORD. MODE 0, A=INPUT
             626                                  ;B AND C=OUTPUT
034A D313    627        OUT  CPORT4
034C 3E82    628        MVI  A,10000010B          ;CONTROL WORD, MODE 0, A=OUPUT
             629                                  ;B AND C INPUT
034E D323    630        OUT  CPORT5
0350 3E1F    631        MVI  A,MRESET             ;RESET MUX BOARD
0352 D320    632        OUT  PORT5A               ;ZERO OUTPUT PORT 5A, THIS ALSO RESETS MUX
0354 3EFF    633        MVI  A,0FFH               ;DISABLE OUTPUTS AND SET DIRECTION OF
             634                                  ;IC13, 74LS245.
0356 D312    635        OUT  PORT4C
0358 3EFF    636        MVI  A,MUXRUN             ;RELEASE MUX FROM ACTIVE RESET
035A D320    637        OUT  PORT5A
035C C9      638        RET
             639 ;
             640 ;
             641 ;;;;;;;;;;;;;;;;;;;;;;;;;;;;;;;;;;;;;;;;;;;;;;;;;;;;;;;;;;;;;;
             642 ; THIS ROUTINE ADDS TO THE H AND L REGISTERS THE VALUE IN A.
             643 ; THE NEW OFFSET VALUE IS RETURNED IN H AND L.
             644 ;;;;;;;;;;;;;;;;;;;;;;;;;;;;;;;;;;;;;;;;;;;;;;;;;;;;;;;;;;;;;;
             645 ;
             646 ;
035D 85      647 OFFSET: ADD L                    ;ADD THE VALUE IN REG. A TO REG. L
035E 6F      648        MOV  L,A                  ;REPLACE REG. L WITH NEW VALUE
035F 3E00    649        MVI  A,00H
0361 8C      650        ADC  H                    ;ADD CARRY (IF ANY) TO REG. H
0362 67      651        MOV  H,A                  ;REPLACE H WITH NEW VALUE
0363 C9      652        RET
             653 ;
             654 ;
             655 ;;;;;;;;;;;;;;;;;;;;;;;;;;;;;;;;;;;;;;;;;;;;;;;;;;;;;;;;;;;;;;
             656 ; THIS ROUTINE CONVERTS A 3-DIGIT NUMBER (ASCII) INTO A 10-BIT
             657 ; BINARY NUMBER.
             658 ;;;;;;;;;;;;;;;;;;;;;;;;;;;;;;;;;;;;;;;;;;;;;;;;;;;;;;;;;;;;;;
             659 ;
             660 ;
0364 7E      661 CNVRT3: MOV A,M                   ;GET SEVENTH DIGIT
0365 D630    662        SUI  30H                  ;CONVERT
0367 6F      663        MOV  L,A
0368 2600    664        MVI  H,00H
```

```
036A 22964F    665          SHLD   BYTE34
               666   ;
036D 2A924F    667          LHLD   HPSAVE
0370 2B        668          DCX    H
0371 7E        669          MOV    A,M        ;GET SIXTH DIGIT
0372 D630      670          SUI    30H
0374 2100CE    671          LXI    H,LT10
0377 85        672          ADD    L
0378 6F        673          MOV    L,A
0379 5E        674          MOV    E,M
037A 1600      675          MVI    D,00H
037C 2A964F    676          LHLD   BYTE34
037F CDD504    677          CALL   WORDAD
0382 22964F    678          SHLD   BYTE34
               679   ;
0385 2A924F    680          LHLD   HPSAVE
0388 2B        681          DCX    H
0389 2B        682          DCX    H
038A 7E        683          MOV    A,M        ;GET FIFTH DIGIT
038B 2B        684          DCX    H
038C 22924F    685          SHLD   HPSAVE
038F D630      686          SUI    30H
0391 87        687          ADD    A
0392 2100CE    688          LXI    H,LT100
0395 85        689          ADD    L
0396 6F        690          MOV    L,A
0397 5E        691          MOV    E,M
0398 23        692          INX    H
0399 56        693          MOV    D,M
039A 2A964F    694          LHLD   BYTE34
039D CDD504    695          CALL   WORDAD
03A0 22964F    696          SHLD   BYTE34
               697   ;
               698   ;
               699   ;;;;;;;;;;;;;;;;;;;;;;;;;;;;;;;;;;;;;;;;;;;;;;;;;;;;;;;;
               700   ; THIS ROUTINE CONVERTS A 4-DIGIT NUMBER (ASCII) INTO A 14-BIT
               701   ; BINARY VALUE.
               702   ;;;;;;;;;;;;;;;;;;;;;;;;;;;;;;;;;;;;;;;;;;;;;;;;;;;;;;;;
               703   ;
               704   ;
03A3 2A924F    705   CNVRT4: LHLD   HPSAVE    ;GET CURRENT CONVERT DATA POINTER
03A6 7E        706          MOV    A,M        ;GET FOURTH DIGIT, LSB
03A7 D630      707          SUI    30H        ;CONVERT ASCII TO HEX
03A9 6F        708          MOV    L,A        ;PUT IN REG. L
03AA 2600      709          MVI    H,00H      ;ZERO THE H REG.
03AC 22944F    710          SHLD   BYTE12     ;SAVE IN BYTES 1 AND 2 LOCATION
               711   ;
03AF 2A924F    712          LHLD   HPSAVE     ;GET CONVERTER POINTER
03B2 2B        713          DCX    H          ;POINT AT THIRD DIGIT
03B3 7E        714          MOV    A,M        ;GET DIGIT
03B4 D630      715          SUI    30H        ;CONVERT TO HEX
03B6 2100CE    716          LXI    H,LT10     ;PUT LOOK-UP TABLE BASE ADDRESS IN HL
03B9 85        717          ADD    L          ;INCREMENT BASE TO APPROPRIATE MULTIPLIER
03BA 6F        718          MOV    L,A
03BB 5E        719          MOV    E,M        ;GET THE MULTIPLIER
03BC 1600      720          MVI    D,00H
03BE 2A944F    721          LHLD   BYTE12     ;GET CURRENT VALUE OF BYTES 1 AND 2
03C1 CDD504    722          CALL   WORDAD     ;ADD THE CURRENT VALUE TO THE PRODUCT
03C4 22944F    723          SHLD   BYTE12     ;STORE THE NEW VALUE FOR BYTES 1 AND 2
               724   ;
03C7 2A924F    725          LHLD   HPSAVE
03CA 2B        726          DCX    H
03CB 2B        727          DCX    H
```

```
03CC 7E        728         MOV    A,M           ;GET SECOND DIGIT
03CD D630      729         SUI    30H           ;CONVERT
03CF 87        730         ADD    A
03D0 21006B    731         LXI    H,LT100       ;GET BASE ADDRESS
03D3 85        732         ADD    L             ;OFFSET THE ADDRESS
03D4 6F        733         MOV    L,A
03D5 5E        734         MOV    E,M           ;GET MULTIPLIER
03D6 23        735         INX    H
03D7 56        736         MOV    D,M
03D8 2A944F    737         LHLD   BYTE12        ;GET BYTEES 1&2
03DB CD0504    738         CALL   WORDAD        ;ADD THE PRODUCT TO THE CURRENT VALUE
03DE 22944F    739         SHLD   BYTE12        ;STORE NEW VALUE
               740         ;
03E1 2A924F    741         LHLD   HPSAVE
03E4 2B        742         DCX    H
03E5 2B        743         DCX    H
03E6 2B        744         DCX    H
03E7 7E        745         MOV    A,M           ;GET FIRST DIGIT
03E8 2B        746         DCX    H
03E9 22924F    747         SHLD   HPSAVE
03EC D630      748         SUI    30H           ;CONVERT
03EE 87        749         ADD    A
03EF 21000A    750         LXI    H,LT1000      ;GET BASE ADDRESS
03F2 85        751         ADD    L             ;OFFSET BASE
03F3 6F        752         MOV    L,A
03F4 5E        753         MOV    E,M           ;GET MULTIPLIER
03F5 23        754         INX    H
03F6 56        755         MOV    D,M
03F7 2A944F    756         LHLD   BYTE12        ;GET CURRENT VALUE
03FA CD0504    757         CALL   WORDAD        ;ADD THE VALUES
03FD 3EC0      758         MVI    A,0C0H        ;INSURE THE FIRST TWO BITS OF MSB ARE SET
03FF B4        759         ORA    H
0400 67        760         MOV    H,A
0401 22944F    761         SHLD   BYTE12        ;STORE FINAL VALUE OF BYTEES 1 AND 2
               762         ;
               763         ;
               764 ;;;;;;;;;;;;;;;;;;;;;;;;;;;;;;;;;;;;;;;;;;;;;;;;;;;;;;;;;;;;;;
               765 ; THIS ROUTINE CONVERTS A THREE DIGIT AREA CODE INTO A 2-BIT
               766 ; BINARY CODE. THIS ROUTINE ALSO COMBINES THIS VALUE WITH THE
               767 ; EXISTING VALUE OF BYTEES 1 AND 2.
               768 ;;;;;;;;;;;;;;;;;;;;;;;;;;;;;;;;;;;;;;;;;;;;;;;;;;;;;;;;;;;;;;
               769         ;
               770         ;
0404 2A924F    771 CNVRTA: LHLD  HPSAVE
0407 7E        772         MOV    A,M           ;GET THIRD AREA CODE DIGIT
0408 D630      773         SUI    30H           ;CONVERT TO HEX
040A 5F        774         MOV    E,A           ;PUT VALUE INTO REG. E
               775         ;
040B 2A924F    776         LHLD   HPSAVE
040E 2B        777         DCX    H
040F 7E        778         MOV    A,M
0410 D630      779         SUI    30H           ;CONVERT
0412 07        780         RLC
0413 07        781         RLC
0414 07        782         RLC
0415 07        783         RLC
0416 B3        784         ORA    E             ;COMBINE THIS VALUE WITH E
0417 5F        785         MOV    E,A           ;REPLACE REG. E WITH NEW VALUE
               786         ;
0418 2A924F    787         LHLD   HPSAVE
041B 2B        788         DCX    H
041C 2B        789         DCX    H
041D 7E        790         MOV    A,M           ;GET FIRST AREA CODE DIGIT
```

```
041E 2B           791        DCX    H
041F 22924F       792        SHLD   HPSAVE
0422 D630         793        SUI    30H           ;CONVERT
0424 67           794        MOV    H,A           ;PUT INTO REG. H
0425 3EF0         795        MVI    A,AREA        ;PUT MSB BASE OF AREA CODE LOOK-UP TABLE IN A
0427 B4           796        ORA    H             ;OFFSET REG. H
0428 67           797        MOV    H,A           ;H&L NOW HAVE ADDRESS OF 2-BIT AREA CODE
0429 6B           798        MOV    L,E           ;PUT LSB CURRENTLY IN REG. E, INTO L
042A 7E           799        MOV    A,M           ;GET 2-BIT AREA CODE
                  800        ;
042B 2A944F       801        LHLD   BYTE12        ;GET CURRENT VALUE OF BYTEES 1 AND 2
042E A4           802        ANA    H             ;COMBINE AREA CODE AND 14-BIT BINARY NUMBER
042F 67           803        MOV    H,A           ;PUT NEW VALUE INTO REGISTER H
0430 22944F       804        SHLD   BYTE12        ;STORE FINAL VALUE
                  805        ;
                  806        ;
                  807 ;;;;;;;;;;;;;;;;;;;;;;;;;;;;;;;;;;;;;;;;;;;;;;;;;;;;;;;;;;
                  808 ; THIS ROUTINE TAKES FOUR ACSII DIGITS, CONVERTS THEM INTO BINARY
                  809 ; AND COMBINES THEM.
                  810 ;;;;;;;;;;;;;;;;;;;;;;;;;;;;;;;;;;;;;;;;;;;;;;;;;;;;;;;;;;
                  811        ;
                  812        ;
0433 2A924F       813 CNVRTD: LHLD  HPSAVE
0436 7E           814        MOV    A,M           ;GET FIRST DATA DIGIT
0437 D630         815        SUI    30H           ;CONVERT
0439 47           816        MOV    B,A           ;PUT INTO B
                  817        ;
043A 2B           818        DCX    H
043B 7E           819        MOV    A,M           ;GET SECOND DATA DIGIT
043C D630         820        SUI    30H
043E 07           821        RLC                  ;PUT 2ND BCD DIGIT INTO MSN
043F 07           822        RLC
0440 07           823        RLC
0441 07           824        RLC
0442 B0           825        ORA    B             ;COMBINE REGISTERS A AND B
0443 6F           826        MOV    L,A
0444 2600         827        MVI    H,00H
0446 229A4F       828        SHLD   BYTE78        ;SAVE WORD #3, BYTES 7 AND 8
                  829        ;
0449 2A924F       830        LHLD   HPSAVE
044C 2B           831        DCX    H
044D 2B           832        DCX    H
044E 7E           833        MOV    A,M           ;GET THIRD DATA DIGIT
044F D630         834        SUI    30H
0451 47           835        MOV    B,A
                  836        ;
0452 2B           837        DCX    H
0453 7E           838        MOV    A,M           ;GET FOURTH DATA DIGIT
0454 D630         839        SUI    30H
0456 07           840        RLC
0457 07           841        RLC
0458 07           842        RLC
0459 07           843        RLC
045A B0           844        ORA    B
045B 6F           845        MOV    L,A
045C 2600         846        MVI    H,00H
045E 22984F       847        SHLD   BYTE56        ;STORE BYTES 5 AND 6, WORD #2
                  848        ;
                  849        ;
                  850 ;;;;;;;;;;;;;;;;;;;;;;;;;;;;;;;;;;;;;;;;;;;;;;;;;;;;;;;;;;
                  851 ; THIS ROUTINE TRANSFERS THE CONVERTED DATA PACKET TO THE OUTPUT
                  852 ; BUFFER.
                  853 ;;;;;;;;;;;;;;;;;;;;;;;;;;;;;;;;;;;;;;;;;;;;;;;;;;;;;;;;;;
```

```
                      854    ;
                      855    ;
04b1 2A8A4F           856          LHLD    CNVRTP      ;GET OUTPUT BUFFER POINTER
04b4 EB               857          XCHG                ;PUT INTO REGISTERS D&E
                      858    ;
04b5 2A944F           859          LHLD    BYTE12      ;GET FIRST TWO BYTES
04b8 7D               860          MOV     A,L
04b9 12               861          STAX    D
04bA 13               862          INX     D
04bB 7C               863          MOV     A,H
04bC 12               864          STAX    D
04bD 13               865          INX     D
                      866    ;
04bE 2A964F           867          LHLD    BYTE34      ;GET SECOND WORD
0471 7D               868          MOV     A,L
0472 12               869          STAX    D
0473 13               870          INX     D
0474 7C               871          MOV     A,H
0475 12               872          STAX    D
0476 13               873          INX     D
                      874    ;
0477 2A984F           875          LHLD    BYTE56      ;GET THIRD WORD
047A 7D               876          MOV     A,L
047B 12               877          STAX    D
047C 13               878          INX     D
047D 7C               879          MOV     A,H
047E 12               880          STAX    D
047F 13               881          INX     D
                      882    ;
0480 2A9A4F           883          LHLD    BYTE78      ;GET FOURTH WORD
0483 7D               884          MOV     A,L
0484 12               885          STAX    D
0485 13               886          INX     D
0486 7C               887          MOV     A,H
0487 12               888          STAX    D
0488 13               889          INX     D
                      890    ;
0489 EB               891          XCHG
048A CDF600           892          CALL    OVERFL      ;SEE IF BUFFER POINTER IS STILL IN RANGE
048D 228A4F           893          SHLD    CNVRTP      ;SAVE NEW OUTPUT BUFFER POINTER
                      894    ;
0490 21AD4F           895          LXI     H,PACKET    ;PUT THE ADDRESS OF PACKET INTO HL
0493 35               896          DCR     M           ;DECREMENT THE CURRENT PACKET COUNT
0494 21BC4F           897          LXI     H,TXFLG     ;PUT ADDRESS OF TXFLG IN HL
0497 36FF             898          MVI     M,0FFH      ;SET DATA AVAILABLE FOR TRANSFER FLAG
0499 3E00             899          MVI     A,00H
049B 32BD4F           900          STA     DATAVA      ;RESET DATA AVAILABLE FLAG
049E C9               901          RET
                      902    ;
                      903    ;
                      904    ;
                      905    ;;;;;;;;;;;;;;;;;;;;;;;;;;;;;;;;;;;;;;;;;;;;;;;;;;;;;;;;;;;;;
                      906    ; THIS ROUTINE MULTIPLIES A 16-BIT VALUE BY A 8-BIT VALUE.
                      907    ; THE NUMBER TO BE MULTIPLIED SHOULD BE STORED IN MEMORY LOC. VALUE.
                      908    ; REGISTERS H&L SHOULD ALSO CONTAIN THE VALUE TO BE MULTIPLIED.
                      909    ; REGISTER A SHOULD CONTAIN THE MULTIPLIER.
                      910    ; THE RESULT (PRODUCT) WILL BE RETURNED IN THE H AND L REGISTERS.
                      911    ;;;;;;;;;;;;;;;;;;;;;;;;;;;;;;;;;;;;;;;;;;;;;;;;;;;;;;;;;;;;;
                      912    ;
                      913    ;
049F 07               914 MULTI: RLC                   ;SEE IF ODD OR EVEN MULTIPLIER
04A0 DAB604           915          JC      ODD         ;IF CARRY, MULTIPLIER IS ODD
                      916    ;
```

```
04A3 0F     917 EVEN:   RRC              ;READJUST MULTIPLIER
04A4 57     918         MOV     D,A      ;PUT IT IN D
04A5 7D     919         MOV     A,L      ;PUT VALUE TO BE MULTIPLIED INTO A
04A6 15     920 ELP1:   DCR     D        ;DECREMENT MULTIPLY COUNTER
04A7 CAD404 921         JZ      DONE
04AA 17     922         RAL
04AB D2A604 923         JNC     ELP1
04AE 6F     924         MOV     L,A
04AF 7C     925         MOV     A,H
04B0 17     926         RAL
04B1 67     927         MOV     H,A
04B2 7D     928         MOV     A,L
04B3 C3A604 929         JMP     ELP1
            930         ;
04B6 3F     931 ODD:    CMC              ;CLEAR CARRY
04B7 1F     932         RAR              ;ADJUST MULTIPLIER
04B8 57     933         MOV     D,A
04B9 7D     934         MOV     A,L
04BA 15     935 OLP1:   DCR     D
04BB CACA04 936         JZ      NOWADD
04BE 17     937         RAL
04BF D2BA04 938         JNC     OLP1
04C2 6F     939         MOV     L,A
04C3 7C     940         MOV     A,H
04C4 17     941         RAL
04C5 67     942         MOV     H,A
04C6 7D     943         MOV     A,L
04C7 C3BA04 944         JMP     OLP1
            945         ;
04CA EB     946 NOWADD: XCHG
04CB 2A9C4F 947         LHLD    VALUE
04CE 7D     948         MOV     A,L
04CF 83     949         ADD     E
04D0 6F     950         MOV     L,A
04D1 7C     951         MOV     A,H
04D2 8A     952         ADC     D
04D3 67     953         MOV     H,A
            954         ;
04D4 C9     955 DONE:   RET
            956         ;
            957         ;
            958 ;;;;;;;;;;;;;;;;;;;;;;;;;;;;;;;;;;;;;;;;;;;;;;;;;;;;;;;;;;;;;;
            959 ; THIS ROUTINE ADDS TWO 16-BIT WORDS.
            960 ; ONE WORD SHOULD BE PLACED IN THE D&E REG. AND THE OTHER IN THE
            961 ; H&L REG.
            962 ; THE RESULT (SUM) IS RETURNED IN THE H&L REGISTERS.
            963 ;;;;;;;;;;;;;;;;;;;;;;;;;;;;;;;;;;;;;;;;;;;;;;;;;;;;;;;;;;;;;;
            964         ;
            965         ;
04D5 7B     966 WORDAD: MOV     A,E
04D6 85     967         ADD     L
04D7 6F     968         MOV     L,A
04D8 7A     969         MOV     A,D
04D9 8C     970         ADC     H
04DA 67     971         MOV     H,A
04DB C9     972         RET
            973         ;
            974         ;
            975         ;
            976         END
```

What is claimed is:

1. A data acquisition method for communicating data from a plurality of data sources to a single destination comprising the steps of:
   buffering packets of data ready to be communicated by said sources, said buffering occurring at said sources;
   defining a sequence in which said plurality of data sources will be individually addressed;
   addressing a first one of said data sources;
   permitting said first source to transfer data from its buffer to a multiplexer for a variable time dependent upon the time required for said data source to transfer all of its data in said buffer; and when said buffer has been emptied, then
   sequentially addressing each of the remaining data sources and permitting each of them in sequence to transfer data from its respective buffer to said multiplexer for a time dependent upon the time required for said respective data source to transfer all of its data in said buffer;
   buffering data at said multiplexer until said destination is ready to receive data; and
   transferring the data buffered at said multiplexer to said destination.

2. The method of claim 1 wherein when each of said data sources is addressed, if it has data ready to be communicated, an interruption of said sequential addressing occurs.

3. The method of claim 2 wherein said multiplexer provides the sequential address to said data sources and wherein after said multiplexer addresses a data source, the addressed data source interrupts said sequential addressing and verifies that the address outputted by said multiplexer after said sequential addressing has been interrupted is the address of said data source, and if so, thereafter communicates data to said multiplexer.

4. The method of claim 2 wherein said sequential addressing is interrupted if inadequate buffering capability exists at said multiplexer.

5. The method of claim 2 including refraining from said interrupting sequential addressing if the addressed data source determines that data is to be inputted thereto.

6. The method of claim 2 wherein said interrupting step includes the data source signalling an apparatus operative in said sequential addressing.

7. The method of claim 1 wherein said data sources comprise automatic number identification computers, said data comprises caller telephone numbers and destination telephone numbers, and said single destination comprises a headend station for controlling the distribution of subscriber material electronically to plural subscribers.

8. A data acquisition system for communicating data from a plurality of data sources to a single destination, comprising:
   a multiplexer coupled to each of said data sources and to said destination, said multiplexer including:
      a sequencing circuit for addressing each of said data sources in a sequence;
      a temporary storage device coupled to receive data transferred from said data sources; and
      means for transferring data from said storage device to said destination;
   a respective buffer at each of said data sources, each said buffer coupled to receive and store temporarily packets of data from its data source to be communicated to said single destination;
   a respective logic circuit at each of said data sources responsive to said sequencing circuit to detect when a respective address is being provided to said logic circuit;
   a respective transfer means to each of said data sources responsive to said logic circuit and coupled to said respective buffer for transferring data from its respective buffer to said multiplexer; and a signalling device coupled to said data sources and to said sequencing circuit for interrupting said sequencing circuit for a time dependent upon the time required for the currently addressed data source to transfer all of its data from its buffer to said multiplexer.

9. The system of claim 8 wherein said signalling device interrupts said sequencing circuit in response to detecting a predetermined condition respecting the capacity of said temporary storage device.

10. The system according to claim 8 wherein said sequencing circuit includes a counting circuit, said system including a bus coupling said counting circuit to each of said logic circuits, each of said logic circuits including a comparison circuit for comparing the count on said bus to respective preselected information, said logic circuits being responsive to a signal from said comparison circuit indicating a match for generating a signal indicating that said counting circuit should stop counting; and means communicating said signal from said logic circuit to said sequencing circuit.

11. The system according to claim 10 wherein said logic circuit is operative further for checking the address outputted by said sequencing circuit after said counting circuit stops, and for transferring data from said data source if the address after said counting circuit has stopped corresponds to the preselected information coupled to said comparison circuit.

12. The system of claim 8 wherein said data sources comprise automatic number identification computers, said data comprises caller telephone numbers and destination telephone numbers, and said single destination comprises a headend station for controlling the distribution of subscriber material electronically to plural subscribers.

* * * * *